US012747165B2

(12) United States Patent
Martelli et al.

(10) Patent No.: US 12,747,165 B2
(45) Date of Patent: Sep. 29, 2026

(54) SEPARATING IONS IN WATER USING PLASTIC ICE VII

(71) Applicant: International Business Machines Corporation, Armonk, NY (US)

(72) Inventors: Fausto Martelli, Stockton Heath (GB); Malgorzata Jadwiga Zimon, Warrington (GB)

(73) Assignee: International Business Machines Corporation, Armonk, NY (US)

( * ) Notice: Subject to any disclaimer, the term of this patent is extended or adjusted under 35 U.S.C. 154(b) by 534 days.

(21) Appl. No.: 18/352,387

(22) Filed: Jul. 14, 2023

(65) Prior Publication Data

US 2025/0019263 A1 Jan. 16, 2025

(51) Int. Cl.

| | |
|---|---|
| ***C02F 1/22*** | (2023.01) |
| ***C02F 1/00*** | (2023.01) |
| *C02F 101/10* | (2006.01) |
| *C02F 101/14* | (2006.01) |
| *C02F 101/20* | (2006.01) |

(52) U.S. Cl.

CPC ................ *C02F 1/22* (2013.01); *C02F 1/008* (2013.01); *C02F 2101/10* (2013.01); *C02F 2101/14* (2013.01); *C02F 2101/20* (2013.01); *C02F 2209/03* (2013.01); *C02F 2209/44* (2013.01)

(58) Field of Classification Search

None

See application file for complete search history.

(56) References Cited

U.S. PATENT DOCUMENTS

| | | | | |
|---|---|---|---|---|
| 8,968,572 B2 | 3/2015 | Riebensahm | | |
| 11,400,399 B2 | 8/2022 | Kobayashi | | |
| 2009/0108237 A1* | 4/2009 | Mao | C01B 13/02 | 252/372 |
| 2010/0114348 A1* | 5/2010 | Boyden | A61K 9/0019 | 700/109 |

FOREIGN PATENT DOCUMENTS

| | | |
|---|---|---|
| CN | 113607605 A | 11/2021 |

OTHER PUBLICATIONS

Journaux et al., "Salt partitioning between water and high-pressure ices. Implication for the dynamics and habitability of icy moons and water-rich planetary bodies", Earth and Planetary Science Letters, 463 (2017) pp. 36-47, Available online Feb. 3, 2017, http://dx.doi.org/10.1016/j.epsl.2017.01.017.

Lammer et al., "What makes a planet habitable?", Astron Astrophys Rev (2009) 17: pp. 181-249, Published online: Apr. 10, 2009, DOI 10.1007/s00159-009-0019-z.

(Continued)

*Primary Examiner* — Richard C Gurtowski

(74) *Attorney, Agent, or Firm* — David K. Mattheis

(57) ABSTRACT

Aspects of the disclosure include a method for separating selected ions in water, a purified water sample, and a controller for a high pressure press. One embodiment of the method may comprise transforming a sample of water into a plastic ice VII block and physically separating a bottom portion of the plastic ice VII block from a top portion of the plastic ice VII block.

18 Claims, 10 Drawing Sheets

(56) References Cited

OTHER PUBLICATIONS

Ludl et al., "Probing ice VII crystallization from amorphous NaCl—D2O solutions at gigapascal pressures", Phys. Chem. Chem. Phys., 2017, 19, pp. 1875-1883, DOI: 10.1039/c6cp07340a.
Martelli et al., "Hydration properties of lanthanoid(III) carbonate complexes in liquid water determined by polarizable molecular dynamics simulations", Phys. Chem. Chem. Phys., 2014, 16, 3693, 13 pages, DOI: 10.1039/c3cp54001d.
Matsumoto et al., "GenIce: Hydrogen-Disordered Ice Generator", Journal of Computational Chemistry, 2018, 39, pp. 61-64.
Matsumoto et al., "Spin-One Ising Model for Ice VII-Plastic Ice Phase Transitions", The Journal of Physical Chemistry, Special Issue: Physics and Chemistry of Ice 2014, Published: Aug. 21, 2014, pp. 13387-13392, dx.doi.org/10.1021/jp5049502.
Mochizuki et al., "Diversity of transition pathways in the course of crystallization into ice VII", Phys. Chem. Chem. Phys., 2014, 16, 16419, 7 pages, DOI: 10.1039/c4cp01616e.
Ninet et al., "Proton Disorder and Superionicity in Hot Dense Ammonia Ice", Physical Review Letters, 108, 165702 (2012), published Apr. 19, 2012, 5 pages, http://dx.doi.org/10.1103/PhysRevLett.108.165702.
Nose, Shūichi, "A molecular dynamics method for simulations in the canonical ensemble", Molecular Physics, 52:2, pp. 255-268, DOI: 10.1080/00268978400101201, Published online: Aug. 22, 2006.
Parrinello et al., "Polymorphic transitions in single crystals: A new molecular dynamics method", Abstract Only, Journal of Applied Physics 52, 7182-7190 (1981), Dec. 1, 1981, 2 pages. https://doi.org/10.1063/1.328693.
Prasad et al., "High-temperature and high-pressure plastic phase of ice at the boundary of liquid water and ice VII", Proceedings Royal Society A 478: 20210958, 18 pages, https://doi.org/10.1098/rspa.2021.0958.
Razmjou et al., "Design Principles of Ion Selective Nanostructured Membranes for the Extraction of Lithium ions", Nature Communications, (2019) 10:5793, 15 pages, https://doi.org/10.1038/s41467-019-13648-7.
Robinson et al., "Plastic and superionic phases in ammonia—water mixtures at high pressures and temperatures", Journal of Physics: Condensed Matter 32 (2020) 184004 (14pp), Published Feb. 4, 2020, https://doi.org/10.1088/1361-648X/ab68f7.
Salzmann et al., "A calorimetric study on the low temperature dynamics of doped ice V and its reversible phase transition to hydrogen ordered ice XIII", Physical Chemistry Chemical Physics 2008, 10, pp. 6313-6324, First published as an Advance Article on the web Sep. 15, 2008, DOI: 10.1039/b808386j.
Salzmann et al., "The low-temperature dynamics of recovered ice XII as studied by differential scanning calorimetry: a comparison with ice V", Phys. Chem. Chem. Phys., 2003, 5, pp. 3507-3517, First published as an Advance Article on the web Jul. 4, 2003, DOI: 10.1039/b305624d.
Salzmann et al., "Thermal properties of metastable ices IV and XII: comparison, isotope effects and relative stabilities", Phys. Chem. Chem. Phys., 2004, 6, pp. 1269-1276, First published as an Advance Article on the web Feb. 13, 2004, DOI: 10.1039/b315180h.
Saur et al., "The search for a subsurface ocean in Ganymede with Hubble Space Telescope observations of its auroral ovals", Journal of Geophysical Research: Space Physics, (2015), Published online Mar. 12, 2015, pp. 1715-1737, doi:10.1002/2014JA020778.
Shephard et al., "Molecular Reorientation Dynamics Govern the Glass Transitions of the Amorphous Ices", The Journal of Physical Chemistry Letters, 2016, 7, pp. 2281-2285, http://dx.doi.org/10.1021/acs.jpclett.6b00881.
Shephard et al., "The complex kinetics of the ice VI to ice XV hydrogen ordering phase transition", Chemical Physics Letters 637 (2015) pp. 63-66, Available online Aug. 7, 2015, http://dx.doi.org/10.1016/j.cplett.2015.07.064.
Skarmoutsos et al., "On the Different Faces of the Supercritical Phase of Water at a Near-Critical Temperature: Pressure-Induced Structural Transitions Ranging from a Gaslike Fluid to a Plastic Crystal Polymorph", The Journal of Physical Chemistry B, 2021, 125, pp. 10260-10272, Published: Sep. 7, 2021, https://doi.org/10.1021/acs.jpcb.1c05053.
Skarmoutsos et al., "The effect of polymorphism on the structural, dynamic and dielectric properties of plastic crystal water: A molecular dynamics simulation perspective", The Journal of Chemical Physics 150.12 (2019), 42 pages.
Sohl et al., "Subsurface Water Oceans on Icy Satellites: Chemical Composition and Exchange Processes", Space Sci Rev (2010) 153: pp. 485-510, Published online: Apr. 13, 2010, DOI 10.1007/s11214-010-9646-y.
Stukowski, Alexander, "Visualization and analysis of atomistic simulation data with OVITO—the Open Visualization Tool", Modelling and Simulation in Materials Science and Engineering, 18 (2010) 015012 (7 pp), Published Dec. 15, 2009, http://dx.doi.org/10.1088/0965-0393/18/1/015012.
Suga et al., "Thermodynamic study of ice and clathrate hydrates", Pure & Appl. Chem., vol. 64, No. 1, pp. 17-26, 1992.
Swope et al., "A computer simulation method for the calculation of equilibrium constants for the formation of physical clusters of molecules: Application to small water clusters", J. Chem. Phys. 76, 637 (1982), 14 pages, Published Online: Oct. 27, 1998, https://doi.org/10.1063/1.442716.
Takii et al., "A plastic phase of water from computer simulation", The Journal of Chemical Physics 128, 204501, 2008, published online May 23, 2008, 8 pages.
Toffano et al., "Temperature- and pressure-dependence of the hydrogen bond network in plastic ice VII", The Journal of Chemical Physics, Aug. 2022, 14 pages, DOI: 10.1063/5.0111189.
Zhang et al., "Observation of a Plastic Crystal in Water—Ammonia Mixtures under High Pressure and Temperature", Journal of Physical Chemistry Letters, 2023, 14, pp. 2301-2307, https://doi.org/10.1021/acs.jpclett.3c00092.
Zimon et al., "Molecular rotations trigger a glass-to-plastic fcc heterogeneous crystallization in high-pressure water", The Journal of Chemical Physics (in press) (2022), Accepted Manuscript Online: Feb. 22, 2023, 32 pages, https://doi.org/10.1063/5.0138368.
"Fractional freezing", Wikipedia, This page was last edited on Dec. 30, 2022, 3 pages, https://en.wikipedia.org/wiki/Fractional_freezing.
"Ice VII", Wikipedia, This page was last edited on Jan. 21, 2023, 4 pages, https://en.wikipedia.org/wiki/Ice_VII.
"Synthetic diamond", Wikipedia, This page was last edited on Jun. 13, 2023, 25 pages, https://en.wikipedia.org/wiki/Synthetic_diamond.
Abascal et al., "A general purpose model for the condensed phases of water: TIP4P/2005", the Journal of Chemical Physics 123, 234505, 2005, 12 pages.
Abraham et al., "GROMACS: High performance molecular simulations through multi-level parallelism from laptops to supercomputers", SoftwareX 1-2 (2015) pp. 19-25, http://dx.doi.org/10.1016/j.softx.2015.06.001.
Adachi et al., "Structure and phase behavior of high density ice from molecular-dynamics simulations with the ReaxFF potential", J. Chem. Phys. 153, 114501 (2020), Published Online: Sep. 16, 2020, 12 pages, https://doi.org/10.1063/5.0016565.
Anonymous, "Latest water purification technologies—top five", Feb. 5, 2021, 18 pages, <https://www.water-technology.net/features/latest-water-purification-technologies-top-five/>.
Aragones et al., "Plastic crystal phases of simple water models", The Journal of Chemical Physics 130, 244504, 2009, 14 pages. http://dx.doi.org/10.1063/1.3156856.
Aragones et al., "The phase diagram of water at high pressures as obtained by computer simulations of the TIP4P/2005 model: the appearance of a plastic crystal phase", Physical Chemistry Chemical Physics, 2009, 11, pp. 543-555, First published as an Advance Article on the web Nov. 6, 2008, DOI: 10.1039/b812834k.
Beghin, Christian, "Self-consistent modeling of induced magnetic field in Titan's atmosphere accounting for the generation of Schumann resonance", Icarus 247 (2015) Available online Oct. 14, 2014, pp. 126-136, http://dx.doi.org/10.1016/j.icarus.2014.10.005.

(56) References Cited

OTHER PUBLICATIONS

Boyarintsev et al., "Separation and purification of elements from alkaline and carbonate nuclear waste solutions", Nuclear Engineering and Technology 55 (2023) pp. 391-407, Available online Oct. 1, 2022, https://doi.org/10.1016/j.net.2022.09.030.
Cavazzoni et al., "Superionic and Metallic States of Water and Ammonia at Giant Planet Conditions", Science, Jan. 1, 1999, vol. 283, pp. 44-46, http://science.sciencemag.org/.
Charbonneau et al., "A super-Earth transiting a nearby low-mass star", Nature, vol. 462, Dec. 17, 2009, 4 pages, doi:10.1038/nature08679.
Cheng et al., "Advances in metal—organic framework-based membranes", Chem. Soc. Rev., 2022, 51 pp. 8300, DOI: 10.1039/d2cs00031h.
Conde et al., "Determining the phase diagram of water from direct coexistence simulations: The phase diagram of the TIP4P/2005 model revisited", The Journal of Chemical Physics 139, 154505 (2013), 9 pages, doi: 10.1063/1.4824627.
Formanek et al., "Molecular Rotations, Multiscale Order, Hyperuniformity, and Signatures of Metastability during the Compression/Decompression Cycles of Amorphous Ices", The Journal of Physical Chemistry B, 2023, 127, pp. 3946-3957, Published: Apr. 11, 2023, https://doi.org/10.1021/acs.jpcb.3c00611.
Frank et al., "Experimental study of the NaCl—H2O system up to 28 GPa: Implications for ice-rich planetary bodies", Physics of the Earth and Planetary Interiors 155 (2006) pp. 152-162, doi:10.1016/j.pepi.2005.12.001.
Gillon et al., "Accurate Spitzer infrared radius measurement for the hot Neptune GJ 436b", A&A 471, L51-L54 (2007). DOI: 10.1051/0004-6361:20078283.
Gillon et al., "Detection of transits of the nearby hot Neptune GJ 436 b", A&A 472, L13-L16 (2007), DOI: 10.1051/0004-6361:20077799.
Haida et al., "Calorimetric study of the glassy state X. Enthalpy relaxation at the glass-transition temperature of hexagonal ice", J. Chem. Thermodynamics 1974, 6, pp. 815-825.
Henao et al., "Structure and dynamics of water plastic crystals from computer simulations", J. Chem. Phys. 154, 104501 (2021), Published Online: Mar. 8, 2021, 11 pages, https://doi.org/10.1063/5.0038762.
Hernandez et al., "Proton dynamics and the phase diagram of dense water ice", The Journal of Chemical Physics, May 2018, 34 pages, DOI: 10.1063/1.5028389.
Hernandez et al., "Stability of high-temperature salty ice suggests electrolyte permeability in water-rich exoplanet icy mantles", Nature Communications, (2022) 13:3303, 9 pages, https://doi.org/10.1038/s41467-022-30796-5.
Himoto et al., "Yet another criticality of water", Phys. Chem. Chem. Phys., 2014, 16, pp. 5081-5087, DOI: 10.1039/c3cp54726d.
Hoover, William G., "Canonical dynamics: Equilibrium phase-space distributions", Physical Review A, vol. 31, No. 3, Mar. 1985, 3 pages.
Hsu et al., "Ongoing hydrothermal activities within Enceladus", Nature, Mar. 12, 2015, vol. 519, 12 pages, doi:10.1038/nature14262.

* cited by examiner

SEPARATING IONS IN WATER USING PLASTIC ICE VII

BACKGROUND

The present disclosure relates to separating ions in water, and more specifically, to separating ions in water using plastic ice VII.

Ice VII is a cubic crystalline form of ice that can be formed from liquid water above 3 Gigapascal (GPa, ~30,000 atmospheres) by lowering its temperature to room temperature or by decompressing heavy water (D2O) ice VI below 95 K1. Ice VII is metastable over a wide range of temperatures and pressures and transforms into low-density amorphous ice (LDA) above 120 K (~153° C.)1. Ice VII can be formed within nanoseconds by rapid compression via shockwaves.

Plastic ice VII is a high-temperature and high-pressure plastic phase of ice that can be formed by shock compression and equilibration. It is at the boundary of liquid water and ice VII phases in which the molecules have a defined lattice position but rotate freely. The hydrogen bond network (HBN) of plastic ice VII acquires a diverse spectrum of topologies distinctly different from that of liquid water and of ice VII at the same pressure.

SUMMARY

According to embodiments of the present disclosure, a method for separating selected ions in water, comprising transforming a sample of water into a plastic ice VII block and physically separating a bottom portion of the plastic ice VII block from a top portion of the plastic ice VII block. In some embodiments, the method may further comprise calculating a first migration time sufficient for substantially all ions in the plastic ice VII block to migrate into the bottom portion of the plastic ice VII block, and maintaining the plastic ice VII block for the calculated first ion migration time. In some embodiments, the method may further comprise inverting the plastic ice VII block, calculating a second migration time sufficient for substantially all of a first ion type to migrate into the top portion of the plastic ice VII block, and maintaining the plastic ice VII block for the calculated second migration time.

According to embodiments of the present disclosure, a purified water sample produced by providing a water sample, wherein the water sample contains a plurality of first ions, transforming the sample of water into a plastic ice VII block and maintaining the plastic ice VII block for a first migration time sufficient for substantially all ions in the water sample to migrate into a first identified portion of the plastic ice VII block. In some embodiments, the method of producing the purified water sample may further comprise inverting the plastic ice block, maintaining the plastic ice VII block for a second migration time sufficient for substantially all of the first ions in the water sample to migrate into a second identified portion of the plastic ice VII block; and physically removing the identified second portion of the plastic ice VII block.

According to embodiments of the present disclosure, a controller for a high pressure press. The controller may comprise one or more processors configured to execute instructions that, when executed on the one or more processors, cause the one or more processors to calculate a first migration time sufficient for substantially all ions in a plastic ice VII block to migrate into a bottom portion of the plastic ice VII block; generate signals that cause a high pressure press to apply sufficient pressure to transform a sample of water into the plastic ice VII block; and generate signals that cause the high pressure press to the plastic ice VII block for the calculated first migration time.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
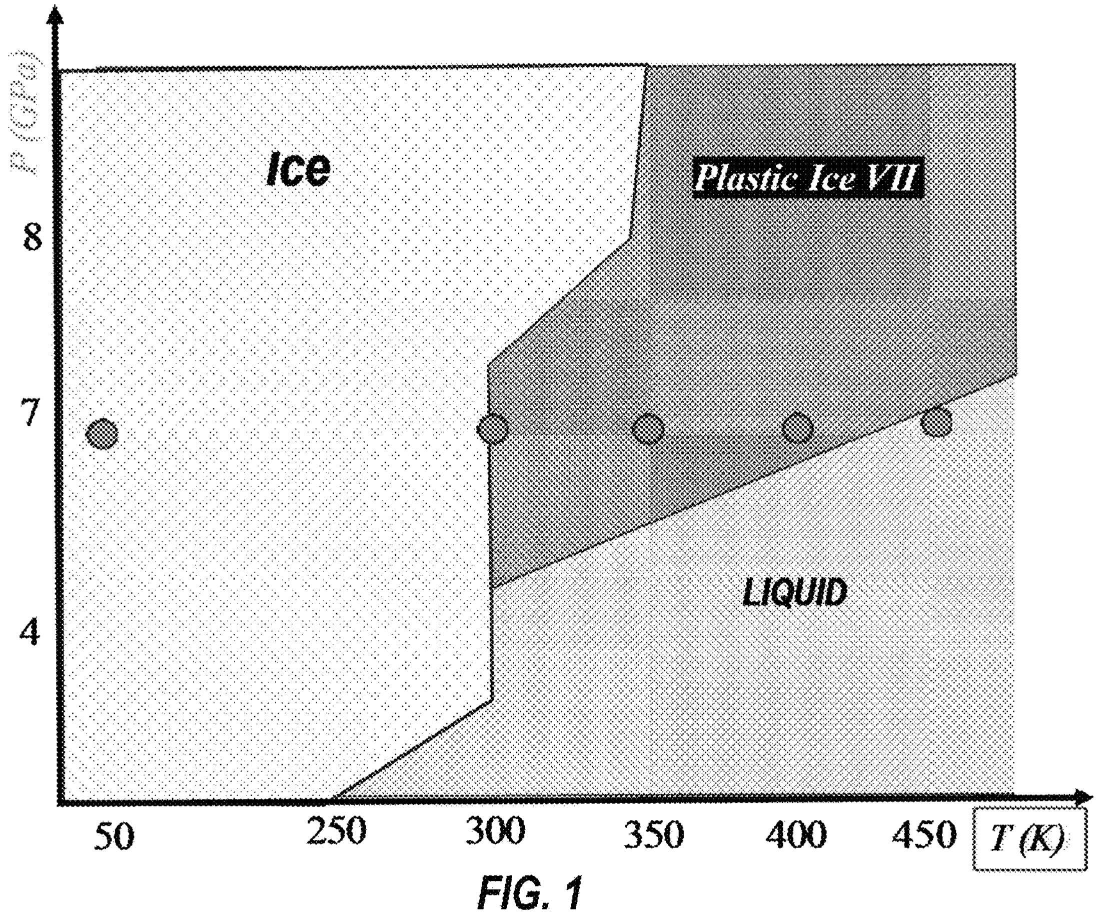
FIG. 1 is a schematic representation of a phase diagram of water in the region of stability of plastic ice VII. At low temperatures and high pressures, the stable phase is crystalline ice VII while at high temperatures and high pressures, the stable phase is liquid water. Plastic ice VII sits at intermediate conditions. The larger dots represent the thermodynamic conditions inspected in this work.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to separating ions in water more particular aspects relate to separating ions in water using plastic ice VII. While the present disclosure is not necessarily limited to such applications, various aspects of the disclosure may be appreciated through a discussion of various examples using this context.

Ice is water frozen into a solid state. The most common phase transition to ice occurs when liquid water is cooled below 0° Celsius (C) (or 273.15 Kelvin (K), 32° Fahrenheit (F)) at standard atmospheric pressure. This form of ice is of a hexagonal crystalline structure denoted as ice $I_h$ (spoken as "ice one h") with minute traces of cubic ice, denoted as ice $I_c$. However, ice may also exist in 18 other known solid crystalline phases, and in amorphous solid states at various densities.

Ice VII and plastic ice VII are two of those other known solid crystalline phases. In plastic ice VII, water molecules are free rotors while the oxygen atoms sit in the ice VII lattice positions corresponding to a body-centered cubic (bcc) structure with Pn3m space group and two atoms per unit cell. The hydrogen bond network of crystalline ice VII is endowed with proton disorder and consists of two independent interpenetrating sub-networks which melt and become indistinguishable in the plastic phase. Thus, advantageously, plastic ice VII is a high density form of ice in which: (i) water molecules do not diffuse; but (ii) water molecule are able to rotate.

Previously, nothing was known about the interactions of electrolytes with plastic ice VII. Accordingly, one aspect of this disclosure is an estimate of electrolyte permeability in plastic ice VII. In particular, this disclosure includes a classical molecular dynamics simulation of electrolytes dissolved in plastic ice VII along the isobar at P=6 GPa (see FIG. 1), and provides information about the mobility of electrolytes and their effects on the bulk modulus. According to numerical investigations, plastic ice VII sits in a relatively narrow region of the phase diagram of water (see FIG. 1, where dots mark the thermodynamic conditions investigated in this disclosure). Advantageously, this investigation shows that: (i) impurities diffuse within the plastic matrix; (ii) the diffusion can be controlled by tuning pressure and temperature; and (iii) different ions diffuse different rates, and therefore, can be isolated and selectively removed from solution.

Another aspect of this disclosure is the application of plastic ice VII to selectively remove a specific ion or specific ion(s) as part of a tailored treatment processes to application requirements, such as targeted removal of fluorocarbon etch gasses and other greenhouse gasses from wastewater. Such gasses are under strong regulatory pressure to limit, or even eliminate, release into the atmosphere. Such targeted toxic ion removal may beneficially reduce the environmental risk of product and/or waste streams from semiconductor manufacturing.

Another aspect of this disclosure is the application of plastic ice VII to selectively remove toxic ions from wastewater. Additionally, ion selectivity may be used in some embodiments to isolate and recover valuable resources from water, such as lithium, sodium, potassium, and/or rare-earth elements (e.g., cerium, dysprosium, erbium, europium, gadolinium, holmium, lanthanum, lutetium, neodymium, praseodymium, promethium, samarium, scandium, terbium, thulium, ytterbium, yttrium, etc.) This aspect may be beneficial for multiple applications, such as the production and/or recovery of lithium and other valuable metals. In some embodiments, ion selectivity may be used to remove undesirable materials from water, such as contaminants and/or purify water (e.g., from chlorine, sodium, or heavy metals).

Another aspect of this disclosure is a method for tuning the selective ion segregation, extraction, and/or filtering via changing pressure(s), temperature(s), and cycle time(s) of a high pressure press (HPP).

Another aspect of this disclosure is a method and system by which ions may be removed and/or water can be filtered/purified without the need for any other material, such as a porous filter material, membrane, or external chemical compounds. Instead, in these embodiments, ions may be collected and removed via application of the differential diffusion rates of various ions within plastic ice VII directly from a water sample. The remaining, purified water sample can be restored back to liquid. This aspect may be beneficial in environments where storage space is at a premium. This aspect may also be desirable in applications where, e.g., the filter or membrane itself may contaminate the sample.

Advantageously, some embodiments may operate at industrially common thermodynamic conditions, such as at pressures of about 2-5 Gigapascals (GPa) and at temperatures of about 300-500 degrees Kelvin.

Molecular Dynamics

This disclosure includes classical molecular dynamics simulations to assess the properties of salt impurities in plastic ice VII. Both structural properties and dynamic properties of $Li^+$, $Na^+$, $K^+$ alkali ions and of $F^-$, and $Cl^-$ halide ions as well as their effects on the bulk modulus have been investigated. Without losing generality, the disclosed simulations have focused on the isobar at P=6 GPa. According to these simulations, molecular rotations drive the mobility of electrolytes and define the elastic properties. When molecular rotations are sluggish, ions diffuse very slowly, while ions diffuse faster when molecular rotations are fast. By following the trajectories of each ion, it can be observed that the diffusion mechanism follows a jump-like kinetics in which the ions leap from one void to the adjacent one and the time spent on each void depends on the ion's chemical nature. This observation may be rationalized using simple chemical intuition supported by numerical evidence. The positive charge of cations tends to repel hydrogen atoms forcing the dipole moments to point outward. Molecular rotations push hydrogen atoms closer to the cations and the resulting electrostatic repulsion favors the escape of the cations. One significant outlier to this mechanism is the $Na^+$ ion, which shows an enhanced diffusivity with respect to, e.g., $Li^+$. This outlier may be explained by noticing that $Na^+$, at variance with other ions examined in this work, is able to momentarily displace a water molecule and occupy its position on the crystal lattice. Therefore, $Na^+$ explores a wider range of possible pathways, resulting in enhanced mobility. On the other hand, the negative charge of anions attracts hydrogen atoms inducing the dipole moments to point inward creating a "cage" of hydrogen atoms that keep the anions in place. Molecular rotations remove hydrogen atoms from this shell, effectively weakening it and favoring the diffusion of the anions to the neighboring void.

Significantly, this analysis shows that plastic ice VII is permeable to electrolytes. Moreover, the presence of electrolytes affects the bulk modulus of plastic ice VII when molecular rotations are sluggish and at high concentrations. At these conditions, the bulk modulus increases almost linearly with the size of the cation-anion pair and indicates an enhanced resistance to the effects of pressure on the unit cell volume. When molecular rotations become faster, on the other hand, the bulk modulus of dirty ice VII is comparable to that of clean plastic VII. Remarkably, the bulk modulus of pristine plastic ice VII with sluggish rotations is one order of magnitude smaller than the bulk modulus of pristine plastic ice VII with fast molecular rotations. This observation showcases the significance of the hydrogen bond network in determining the properties of water.

More specifically, the disclosed analysis includes the results of a classical molecular dynamics (MD) simulation of systems composed of N=1024 and N=3456 rigid water molecules described by the TIP4P/2005 interaction potential in the isobaric (NPT) ensemble. This water model is able to reproduce relatively well the phase diagram of water at the thermodynamic conditions of interest of this work. Numerical simulations have been performed with the GROMACS 2021.5 package, described in more detail in Abraham, M. J.; Murtola, T.; Schulz, R.; P'all, S.; Smith, J. C.; Hess, B.; Lindahl, E., "GROMACS: High performance molecular simulations through multi-level parallelism from laptops to supercomputers." SoftwareX 2015, 1, 19-25. The simulations focus on the isobar P=6 GPa and T∈[50, 450] K, in which plastic ice VII shows both fast and slow molecular rotations. Coulombic and Lennard-Jones interactions are calculated with a cutoff distance of 1.1 nm and long-range electrostatic interactions are treated using the Particle-Mesh Ewald (PME) algorithm. Temperatures and pressures are controlled using the Nos6-Hoover thermostat with a constant of 0.2 ps, and the Parrinello-Rahman barostat with a time constant of 1 ps. Equations of motions are integrated with the Verlet algorithm with a time step of 1 fs. The initial configurations of ice VII have been obtained with the GenIce tool, described in more detail in Matsumoto, M.; Yagasaki, T.; Tanaka, H., "GenIce: Hydrogen-Disordered Ice Generator," *J. Comp. Chem.* 2017, 39, 61-64.

The disclosed simulation initially performs a 1 ns equilibration of ice VII at each thermodynamic condition considered in this disclosure. The bcc structure of ice VII provides large open voids in fcc locations within the structure where impurities are randomly incorporated. The disclosed simulation randomly adds one cation and one ion in different voids to keep an overall neutral simulation box. This operation was performed using the GROMACS command line INSERT-MOLECULES, which positions ions randomly in the matrix with trial moves until the distance between water molecules and the inserted ions is below a certain cutoff. In order to minimize the mutual effects between ions, the disclosed simulation only keeps configurations for which the initial cation-anion distance is as close as possible to ½ of the simulation box.

The disclosed simulation simulated the following "dirty" ice VII mixtures: $Li^+$—$F^-$, $Li^+$—$Cl^-$, $Na^+$—$F^-$, $Na^+$—$Cl^-$, $K^+$—$F^-$, and $K^+$—$Cl^-$. It then equilibrated the system for an extra 500 ps, followed by long 5 ns production runs. For each cation-anion pair, it simulated three independent runs per simulation box. At the conditions here inspected, the diffusivity of each ion was so slow that it is independent of the nature of the counter-ion and of the concentration. For this reason, for each ion, the disclosed simulation averaged all simulations independently on the counter-ion unless otherwise specified. Therefore, considering that the disclosed simulation simulated three cations and two anions, the results for each cation are the average of 12 runs. In contrast, the results for each anion are the average of 18 runs.

The disclosed simulations were performed in cubic boxes with periodic boundary conditions. In Table 1 (below) with the report length of our simulation boxes in pristine and dirty plastic ice VII at each thermodynamic condition. The first three rows refer to the simulation box with 1024 water molecules, while the last three rows to the simulation box with 3456 water molecules. It is possible to observe how the presence of cation-ion pairs does not appreciably affect the size of the clean sample.

TABLE 1

Length in nm of the cubic simulation box for pristine plastic ice VII and for dirty plastic ice VII containing the reported impurities. The first three lines refer to the simulation box with 1024 water molecules, while the last three lines refer to the simulation box with 3456 water molecules.

| | Pristine | LiF | LiCl | NaF | NaCl | KF | KCl |
|---|---|---|---|---|---|---|---|
| 300 K | 2.6133(2) | 2.6193(4) | 2.6170(3) | 2.6171(5) | 2.6153(3) | 2.6181(5) | 2.6163(6) |
| 350 K | 2.6453(7) | 2.6494(5) | 2.6479(5) | 2.6481(6) | 2.6466(5) | 2.6487(4) | 2.6472(3) |
| 400 K | 2.6133(3) | 2.6193(5) | 2.6170(6) | 2.6171(4) | 2.6153(5) | 2.6181(6) | 2.6165(4) |
| 300 K | 3.9202(3) | 3.9219(3) | 3.9212(4) | 3.9209(4) | 3.9203(3) | 3.9213(3) | 3.9208(5) |
| 350 K | 3.9694(5) | 3.9694(6) | 3.9694(7) | 3.9694(5) | 3.9688(7) | 3.9697(6) | 3.9691(5) |
| 400 K | 3.9820(5) | 3.9824(7) | 3.9817(5) | 3.9818(6) | 3.9812(4) | 3.9821(7) | 3.9815(6) |

Figure 2:
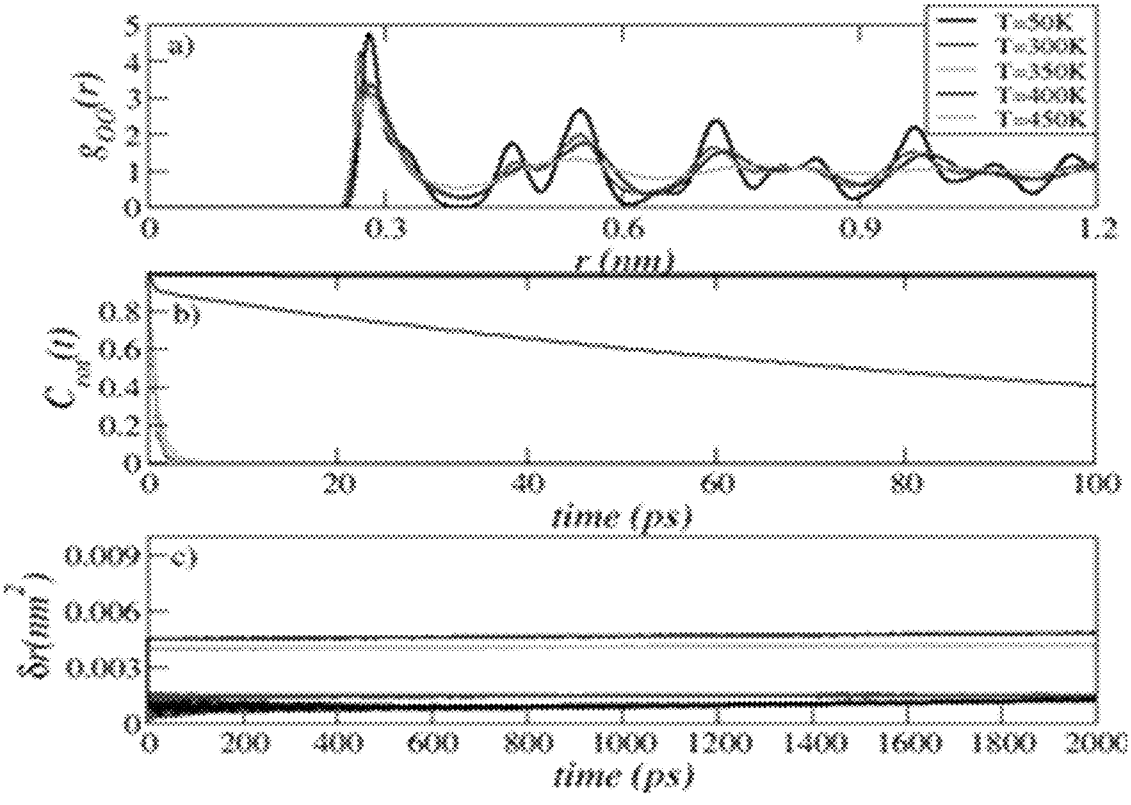
FIG. 2 is a characterization of a clean system (without ions) along the isobar P=6 GPa at T=50 K, T=300 K, T=350 K, T=400 K, and T=450 K. Panel a) shows the oxygen-oxygen radial distribution function $g_{OO}(r)$. Panel b) shows the rotational autocorrelation function $C_{rot}(t)$. Panel c) shows the mean square displacement δr.

FIG. 2 is a chart summarizing the predicted structural and dynamical properties of pristine (plastic) ice VII along the isobar P=6 GPa. Panel a) reports the oxygen-oxygen radial distribution function gOO(r); panel b) reports the rotational autocorrelation function Crot(t); and panel c) reports the mean square displacement δr. At T=50 K the system is ice VII: the gOO(r) shows the typical profile of thermalized ice VII with bcc symmetry characterized by a first peak at ~0.28 nm and a shoulder at ~0.32 nm. The space between the first peak and the second peak, located at ~0.45 nm, is empty, indicative of a clear separation between shells of neighbors. The profile of the gOO(r) at progressively higher distances shows the presence of well-defined and structured peaks confirming the crystalline nature of the sample. Water molecules are not able to rotate, as shown in panel b) reporting the rotational autocorrelation function C(t)~1. Translational degrees of freedom are confined to thermal vibration around the lattice sites, as shown in panel c) reporting the mean square displacement δr as a function of the simulation time. The profile of δr fluctuates at δr~0.001 $nm^2$.

Upon increasing the temperature to T=300 K the profile of the gOO(r) is still consistent with that of thermalized ice VII; all peaks are recognizable although smoothed due to thermal vibration. This effect is visible with the lower intensity of, e.g., the second and third peaks and the corresponding increase in the minima separating them. Similarly, an increase in the population can be observed between the third and the fourth peak located at ~0.77 nm, with the minima shifted from ~0.62 nm to ~0.65 nm, and a corresponding decrease in intensity of the fourth peak. Similar observations apply to larger distances. Although the profile of the gOO(r) describes a thermalized crystal, the profile of Crot(t) reported in panel b), shows that molecular rotations are active, while the δr reported in panel c), confirms that translational degrees of freedom are confined to molecular vibrations. Therefore, this phase is a plastic phase with sluggish molecular rotations.

Upon increasing the temperature to T=350 K and T=400 K, the oxygen atoms remain in the lattice positions of ice VII as reported by the profile of the gOO(r), panel a) distributions, respectively. On the other hand, the rotational autocorrelation functions Crot(t) reported as lines in panel b) decay much faster, indicating that rotational degrees of freedom are more active. Nonetheless, as shown in panel c), the mean square displacement indicates that translational degrees of freedom are still confined to vibrations around the lattice positions. Interestingly, upon increasing the temperature from T=50 K to T=300 K, i.e., by 250 K, it can be observed that δr increases by the very small amount ~0.002 $nm^2$, from δr~8×10−4 in ice VII to δr ~0.001 $nm^2$ in plastic ice VII. On the other hand, upon increasing the temperature by only 50 K, from T=300 K to T=350 K, δr increases by four times. It is hypothesized that the increase in δr from crystalline ice VII to plastic ice might be caused by molecular rotations via frequent bond making/breaking rotations induce push/pull effects on neighboring molecules depending on the orientations of hydrogen atoms, enhancing δr. Such a hypothesis finds therefore here corroboration: sluggish molecular rotations affect only marginally δr, while molecular rotations comparable to those in the liquid phase greatly affect δr.

Finally, upon increasing the temperature to T=450 K, the system melts. The gOO(r) reported in panel a), is typical of a liquid with no recognizable crystalline features and populated space between the first and second shells of neighbors. The rotational correlation function Crot(t) reported in panel b) shows a rapidly decaying profile. Finally, the mean square displacement δr is not shown in panel c) as it rapidly goes off the scale.

Figure 3:
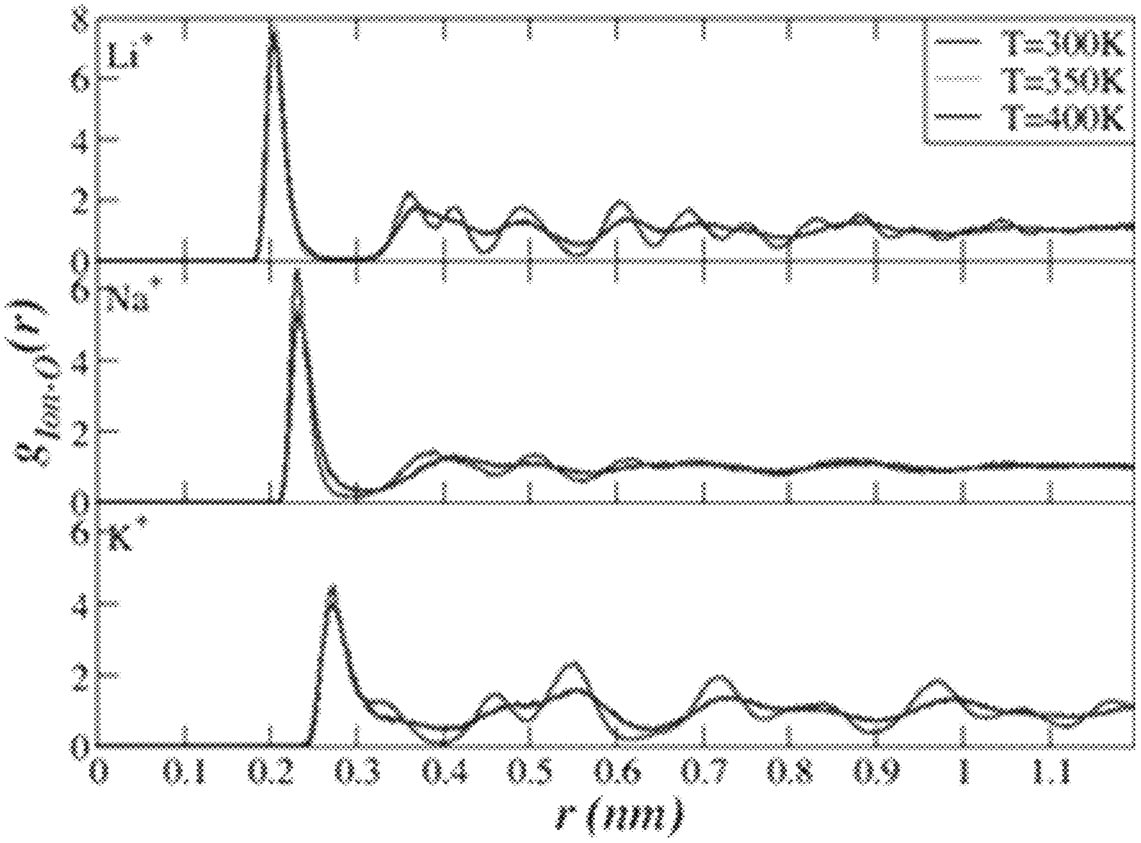
FIG. 3 depicts the alkali ion-oxygen radial distribution functions computed at T=300 K, T=350 K, and T=400 K.

Next, mixtures of plastic ice VII/electrolytes are discussed. In the following, the properties of each ion are discussed separately, as their individual effects on plastic ice VII are independent of the counter-ion. FIG. 3 shows the radial distribution functions computed between the cations and oxygen atoms. The upper panel reports the gIon-O(r) for Li+, the middle panel for Na+, and the lower panel for K+. For each ion, we compute the gIon-O(r) at T=300 K, T=350 K and T=400 K.

At T=300 K, corresponding to the temperature at which molecular rotations are sluggish, the gIon-O(r) between Li+ and water's oxygens shows a first peak centered at ~0.22 nm and a series of well defined, crystalline-like peaks. The overall distribution suggests that Li+ is surrounded by oxygen atoms arranged in the hcp symmetry. Upon increasing the temperature, the main peak becomes slightly more intense, and the crystalline-like peaks become smoothed. The space between the first and the second shell remains unpopulated, suggesting that the Li+ ion might spend most of the time in interstitial positions.

The Na+ ion shows gIon-O(r) distributions with a main peak slightly shifted at higher distances, namely at ~2.5 nm. At T=300 K the gIon-O(r) shows a first peak well-separated from the second peak located at ~0.38 nm, and the presence of several other peaks at increasingly larger distances. On the other hand, compared to the gIon-O(r) of Li+ at the same temperature (red distribution, upper panel) we can notice that the gIon-O(r) for Na+ is much less structured, possibly closer to that of a slowly diffusing system. Upon in-creasing the temperature to T=350 K and T=400 K, the main peak becomes less intense, the first minimum less deep and shifted towards larger distances (~0.32 nm). Correlations at larger distances become less pronounced, and the overall gIon-O(r) is indicative of a diffusing system.

At T=300 K, the gIon-O(r) for the K+ ion (lower panel) shows a crystalline-like distribution comparable to that of ice VII with bcc symmetry, suggesting that K+ are surrounded by oxygen neighbors sitting in the bcc cell and that the K+ ion may not diffuse withing the plastic matrix. In particular, a further shift of the main peak to ~0.28 nm may be observed. Similar to Na+, upon increasing the temperature to T=350 K and T=400 K, the gIon-O(r) becomes similar to that of a liquid, suggesting that the ion might diffuse within the plastic matrix.

From this initial investigation, the main peak of the gIon-O(r) may be observed to shift to higher distances upon increasing the ion's atomic number. Furthermore, the gIon-O(r)s computed in the plastic phase at T=300 K, i.e., when molecular rotations are slow, may be observed as being reminiscent of crystalline structures. A marked change in the gIon-O(r)s occurs upon increasing the temperature to T=350 K, i.e., when molecular rotations are faster, hence pointing towards the possibility that molecular rotations may guide/define ions diffusion in plastic ice VII.

Figure 4:
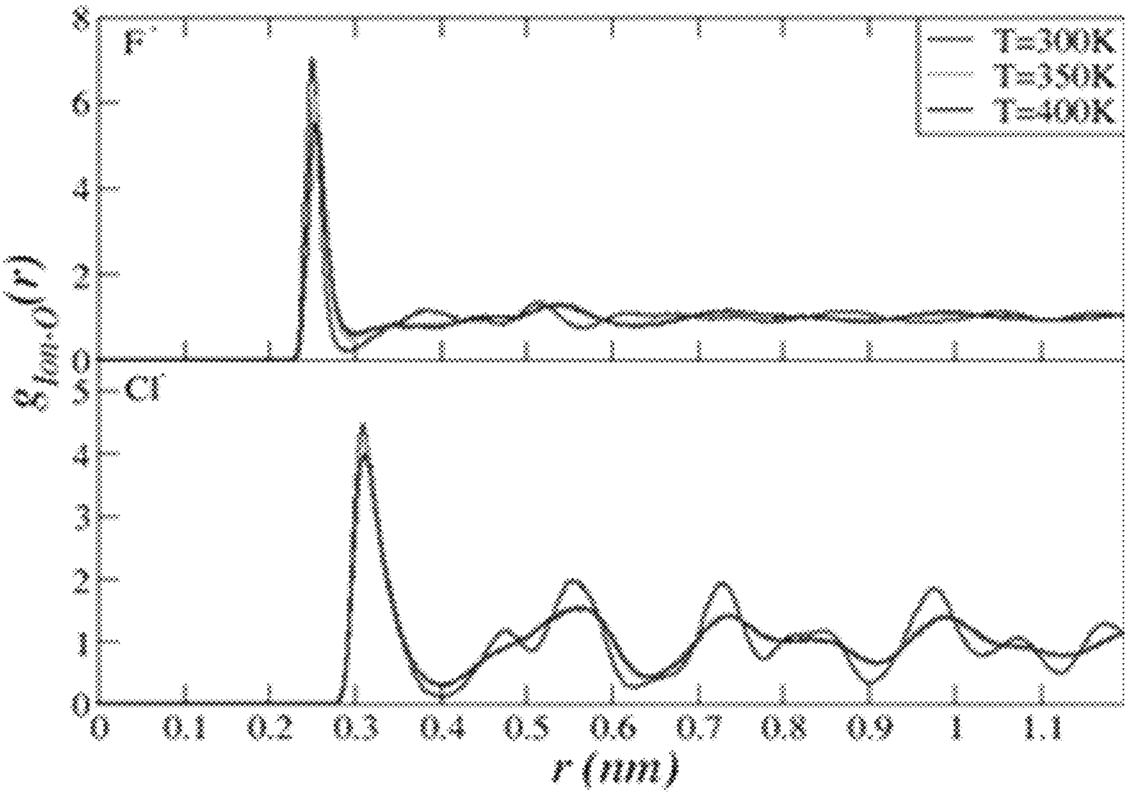
FIG. 4 depicts halide ion-oxygen radial distribution functions computed at T=300 K, T=350 K, and T=400 K.

In FIG. 4, gIon-O(r) computed between the anions $F^-$ (upper panel) and $Cl^-$ (lower panel), and water's oxygen atoms is reported. The distributions refer to T=300 K, the distribution to T=350 K, and the blue distribution to T=400 K. At T=300 K, the gIon-O(r) for F− shows a first peak centered at ~0.25 nm followed by a deep minimum and a second peak at ~0.38 nm and a third peak at ~0.52 nm. Upon increasing the temperature to T=350 K and T=400 K, the intensity of the first peak decreases and the details of the long-range correlations tend to wear off, suggesting that F− ions may diffuse within the plastic matrix.

The Cl− ion shows a gIon-O(r)s drastically different with respect to the F− ion. At T=300 K (red distribution) a first peak located at ~0.33 nm followed by a deep minimum and a sequence of peaks at larger distances indicative of a crystalline structure may be observed. Therefore, we posit that Cl− ions in a matrix of plastic ice VII at T=300 K do not diffuse. On the other hand, upon increasing the temperature to T=350 K and T=400 K, it may be observed that the intensity of the first peak slightly decreases and the details of the peaks at larger distances are loosened but the main crystalline nature still recognizable: the second and third peak present at T=300 K merge into one, as the following peaks. Nonetheless, the second peak is strongly asymmetric, and the peaks at larger distances are still present. Therefore, the gIon-O(r)s at T=350 K and T=400 K suggest that Cl− ions may be trapped in the interstitial sites without being able to diffuse. The inspection of the gIon-O(r)s for F− and Cl− ions suggest that F− ions may be able to diffuse within the plastic matrix, especially when molecular rotations are fast, i.e., at T=350 K and T=400 K.

Figure 5:
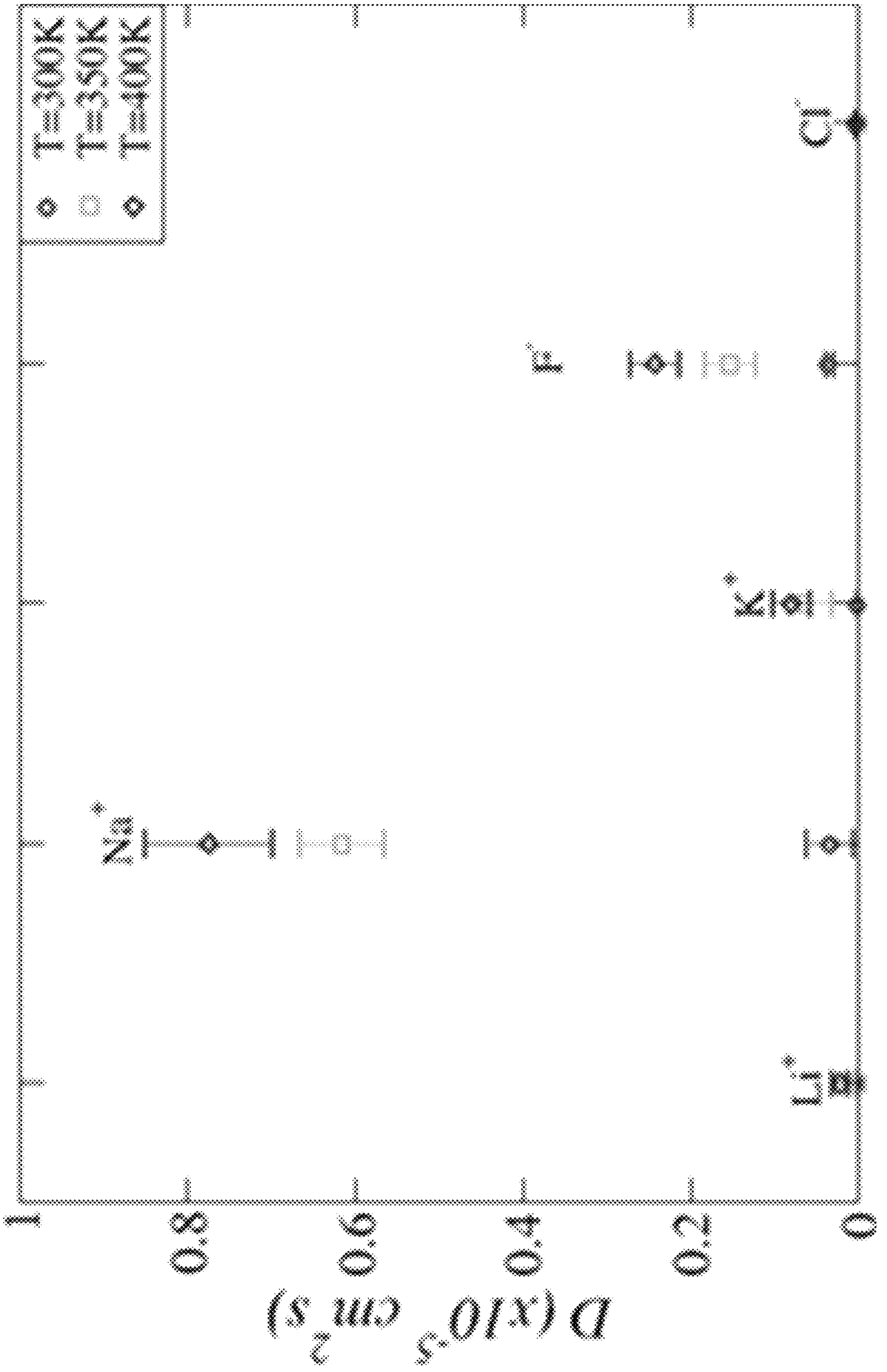
FIG. 5 depicts diffusion coefficients computed at T=300 K, T=350 K, and T=400 K.

In the following discussion, the mobility of different ions within the plastic matrix will be investigated and characterized. Depending on their chemical nature, and on the pace of molecular rotations, ions permeate more or less efficiently within the plastic matrix. FIG. 5 is a candle chart that reports the diffusion coefficients of different ions at three temperatures, computed from the mean square displacement. Significantly, the diffusion of each ion is independent on the nature of the counter-ion and on the concentration. Circles refer to T=300 K, squares refer to T=350 K, and diamonds refer to T=400 K. It can be observed that, at T=300 K, i.e., in correspondence with sluggish water's molecular rotations, the diffusion coefficient is almost null for all ions except Na+ and F−, which are characterized by finite, but still very low, diffusion coefficients. Upon increasing the temperature to T=350 K and to T=400 K, i.e., when molecular rotations occur on timescales comparable to that of liquid water, ionic diffusion is considerably impacted. In particular, a substantial increase on Na+, K+, and F− ions can be observed, while Li+ is only slightly affected. Finally, Cl− is mostly unaffected.

Figure 6:
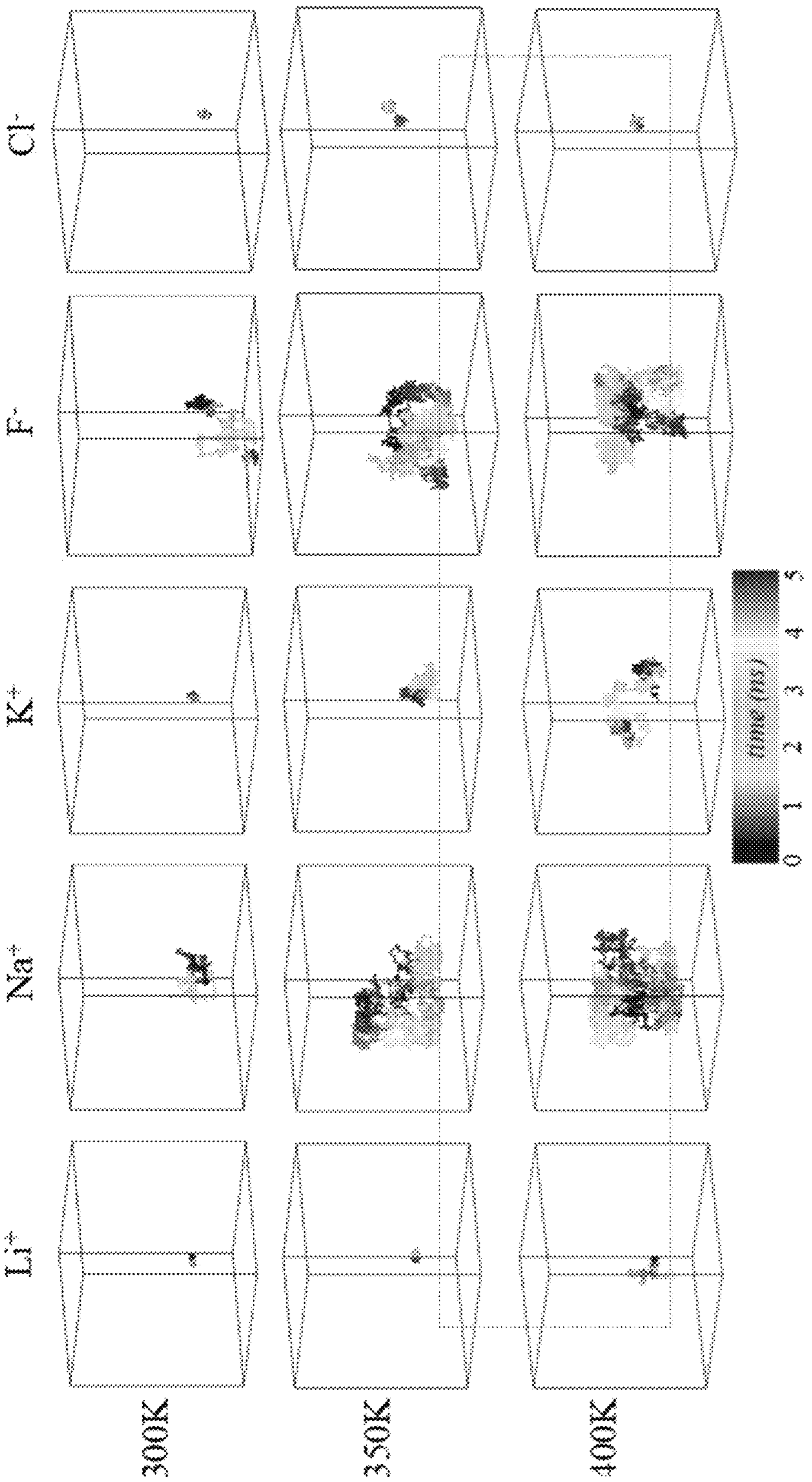
FIG. 6 depicts a plurality of simulation boxes reporting the trajectories paths at P=6 GPa for the ions computed at T=300 K (upper line), T=350 K (middle line) and T=400 K (lower line). Water molecules are removed for the sake of clarity. The shades map the progressing simulation times with the darkest shades defining the beginning of the simulation and lightest shades defining the end of the simulation.
Figure 7:
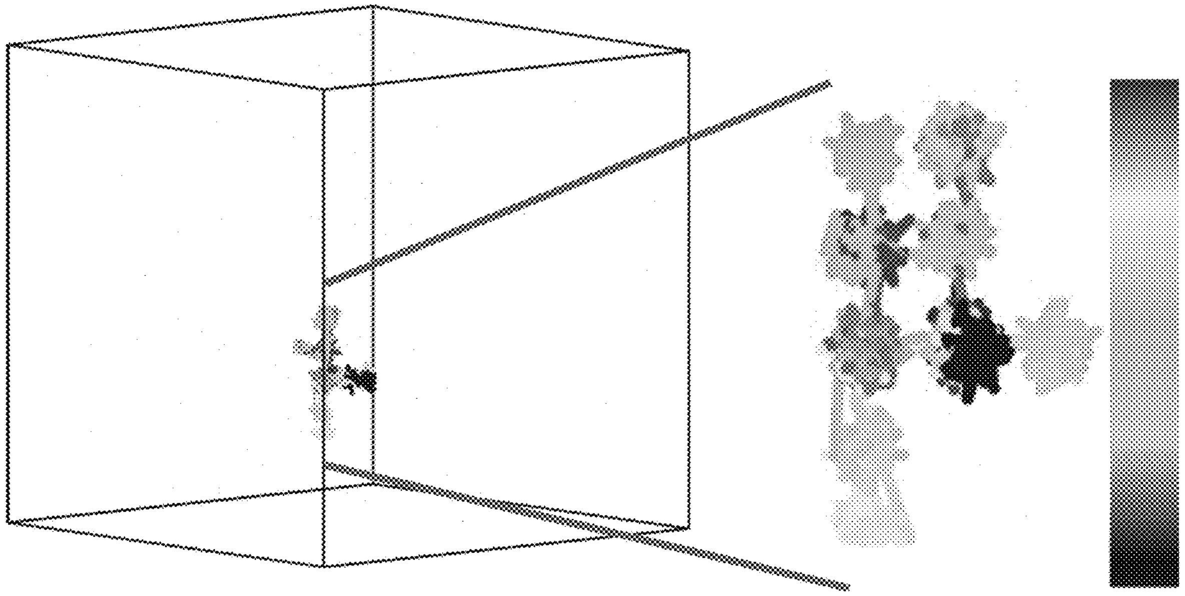
FIG. 7 shows the trajectory path for $Li^+$ at T=400 K in more detail. Water molecules are removed for the sake of clarity. The shades map the progressing simulation times with the darkest shades defining the beginning of the simulation and lighter shades defining the end of the simulation.

In order to understand how ions diffuse in a matrix in which oxygen atoms sit in crystalline lattice positions, ions' trajectories have been tracked and visualized them with the software OVITO, which is described in more detail in Stukowski, A. Visualization and analysis of atomistic simulation data with OVITO—the Open Visualization Tool. Model. Simul. Mat. Sci. Eng. 2009, 18, 015012. FIG. 6 shows the simulation box of one run at P=6 GPa for different ions. For the sake of clarity, water molecules have been removed and display only the trajectory of each ion as a function of time depicted following the legend: darker shades at the beginning of the simulation to lighter shades at the end of the simulation. In agreement with FIG. 5, Li+ rattles within the cage of oxygen neighbors at T=300 K and explores a broader space only at higher temperatures. However, as shown by the trajectory lines, the ion spends considerable time in a restricted area before changing the neighborhood, a mechanism shared with all other ions. This can be clearly seen in FIG. 7, which reports a blown-up of the trajectory line for Li+ at T=400 K. It is possible to observe how the ion spends hundreds of picoseconds visiting a local neighborhood, with the lobes representing the interstitial space between lattice positions. Therefore, a significant mechanism driving the diffusion of Li+ ions is a jump between neighboring interstitial positions. This mechanism is shared with other ions, with the time spent in the interstitial positions depending on the ion and the temperature. The second column of FIG. 6 shows the trajectory lines for Na+. It can be observed that this ion explores a wider space of the simulation box and that a major increment of the visited position occurs moving from T=300 K to T=350 K, i.e., when water's molecular rotations are comparable with those of liquid water. As for Li+, K+ does not diffuse at T=300 K. On the other hand, when water's molecular rotations become fast, the K+ ion can explore some regions of the simulation box. The jump mechanism and the characteristic lobes are clearly visible. The F− ion explores a small region of the simulation box even at T=300 K, in agreement with the diffusion coefficients reported in FIG. 5, while a boost in diffusion and, hence, in the explored regions, occurs at T=350 K and T=400 K. Finally, the ion Cl− visits only two neighboring sites within the 5 ns of simulation at the highest temperature, confirming that its diffusion is extremely slow.

Figure 8:
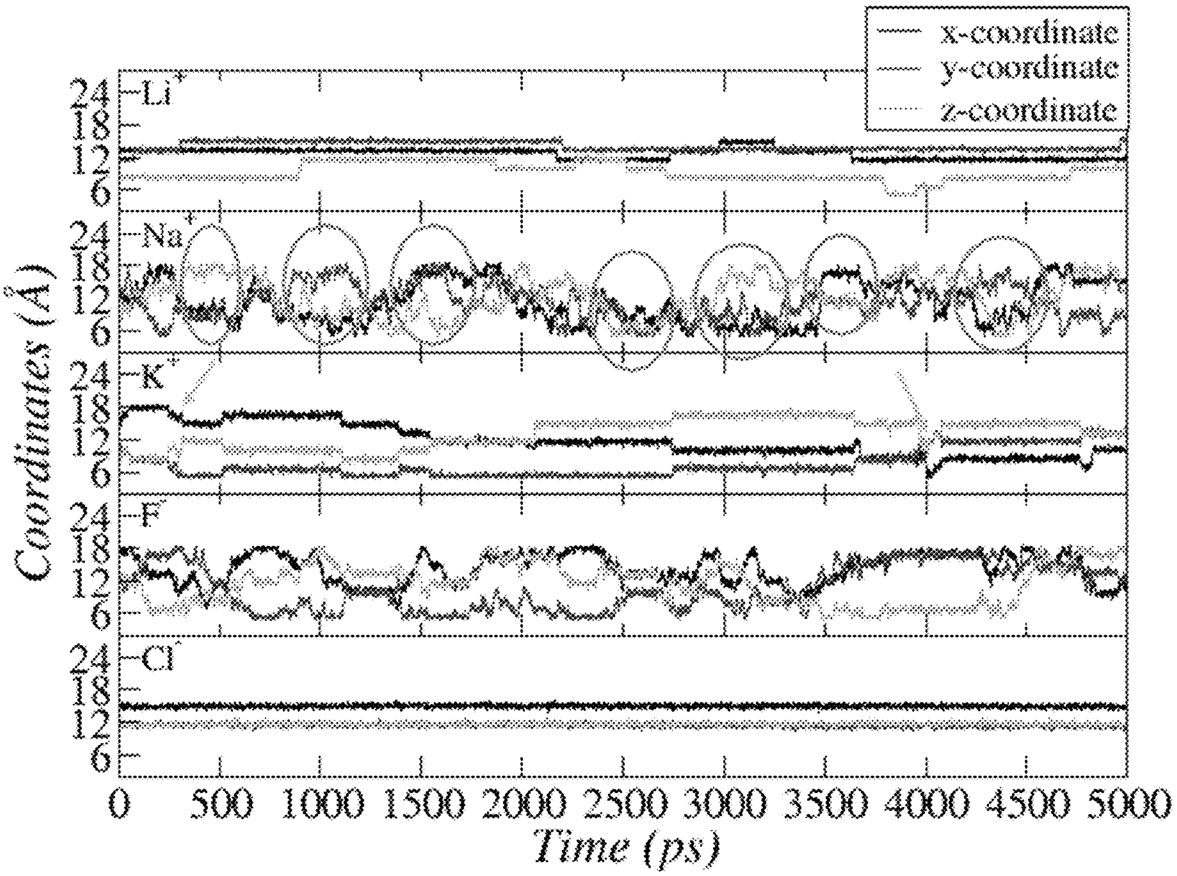
FIG. 8 shows ions' trajectories paths at T=400 K as a function of the simulation time. The x-coordinates are reported on one line, the y-coordinates are reported on a second line, and the z-coordinates are reported on a third line. The arrows mark smooth transitions in $K^+$. The circles locate the interstitial regions in which $Na^+$ ions spend longer times.
Figure 9:
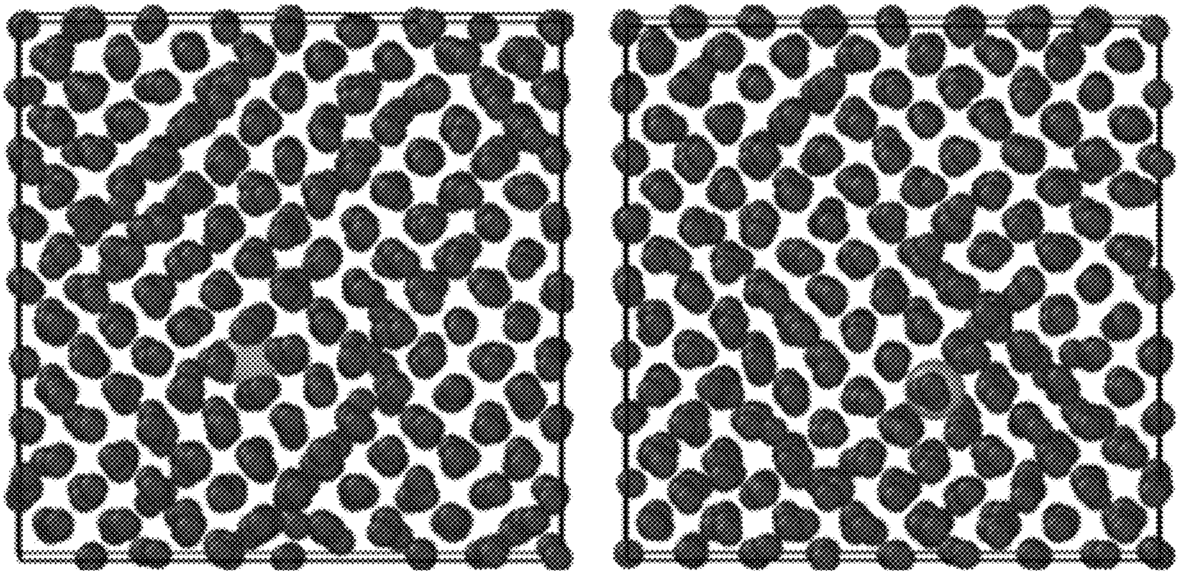
FIG. 9 comprises two representative snapshots showing a $Na^+$ ion as a sphere sitting on an interstitial position in panel a), and on a substitutional position in panel b). Oxygen atoms are reported as spheres, while the counter-ion and hydrogen atoms are omitted for the sake of clarity.

A jump-like mechanism is characterized by a sudden and discontinuous change in the value of coordinates. The extent to which ions diffuse following a jump-like mechanism can be seen in FIG. 8, which shows the x-, the y-, and the z-coordinates of each ion as a function of the simulation time for a sample case at T=400 K. Jumps are visible as steps in the trajectory lines of Li+ (first panel). In the case of K+ (third panel), it is possible to observe the presence of some continuous transition indicated by the arrows, but most of the processes occur via jumps. Smooth transitions occur very often in the case of Na+ ions (second line). Stationary regions, characterized by the absence of coordinates changes, are emphasized by the circles. The continuous transitions are indicative of different kinetics driving the diffusion of Na+. At variance with other cations, Na+ can visit substitutional sites of (plastic) ice VII, i.e., it can momentarily displace a water molecule. Na+ is, therefore, less constrained with respect to other ions, hence accounting for the higher diffusivity reported in FIG. 5. FIG. 9 reports two representative snapshots of Na+ occupying an interstitial site: panel a), and a substitutions site, panel b). The Na+ ion is reported as a sphere, while spheres represent oxygen atoms. The counter-ion and hydrogen atoms are omitted for clarity. F− ions (fourth panel of FIG. 8) represent an intermediate case between the jump-like mechanism governing Li+ and K+ and the smoother dynamics governing Na+. Both dynamics are present along with long stationary regions. Finally, the Cl− ion (last panel of FIG. 8) does not leave the initial interstitial position within the 5 ns of this specific simulation in this particular run.

Figure 10:
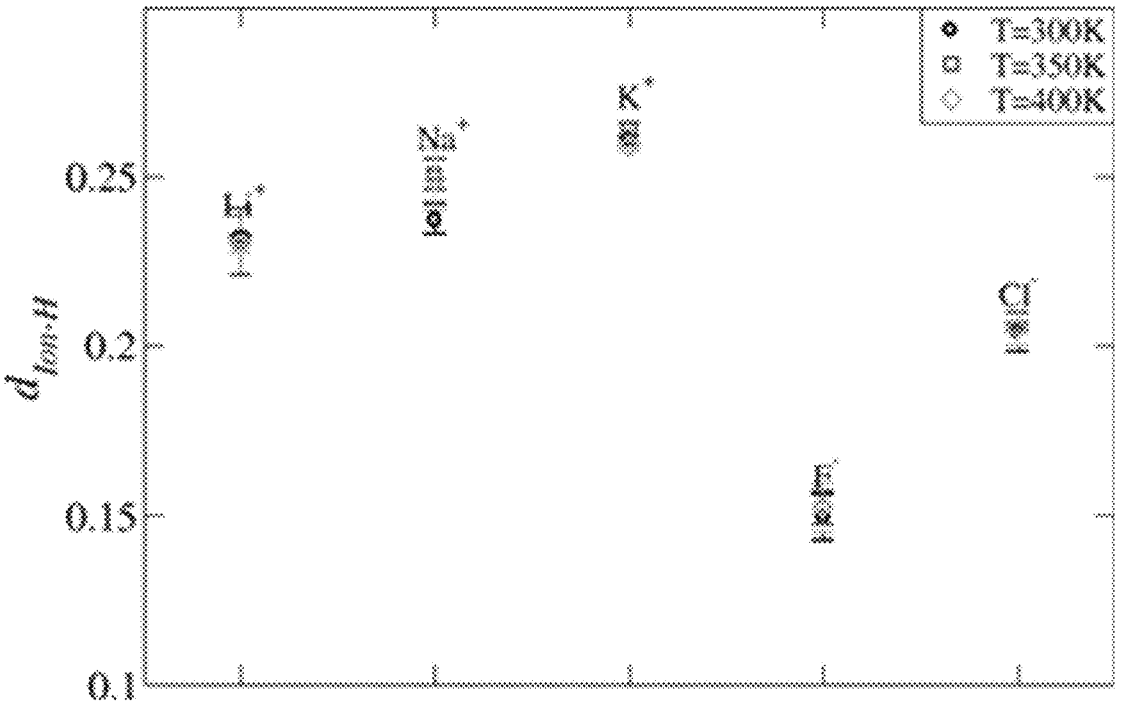
FIG. 10 shows the distance between ions and the hydrogen atoms within the first shell of neighbors computed at P=6 GPa.

Further insights into the jump-like mechanisms can be gained by starting from the notion that the opposite charges of cations and anions induce different effects on their local neighborhood. The positive charge of cations has a repulsive effect on the hydrogen atoms, pushing water molecules to orient their dipole moments away from the cations. Jumps are then favored when molecular rotations force hydrogen atoms to point toward the cations, as the electrostatic repulsion acts as an additional force to the thermal energy. On the other hand, the negative charge of anions has an attractive effect on the hydrogen atoms, inducing the molecular dipole to preferentially orient inwards, toward the anions, effectively creating an electrostatic "cage" which keeps the anions in place. Jumps are favored when molecular rotations allow water molecules to point hydrogen atoms away from the anions, effectively weakening the electrostatic cage. In FIG. 10, the distance computed between the ions and the closest hydrogen atoms of water molecules belonging to the first shell of neighbors is reported. The distance between cations and hydrogen atoms is larger compared to that of anions and hydrogen atoms, due to the different effects exerted by cations and anions on water molecules. Upon increasing the temperature and inducing faster molecular rotations (panel b)), salt impurities do not appreciably affect the bulk modulus of plastic ice VII. Therefore, it can be predicted that the elastic properties of plastic ice VII are determined by the dynamics of the hydrogen bond network.

Figure 11:
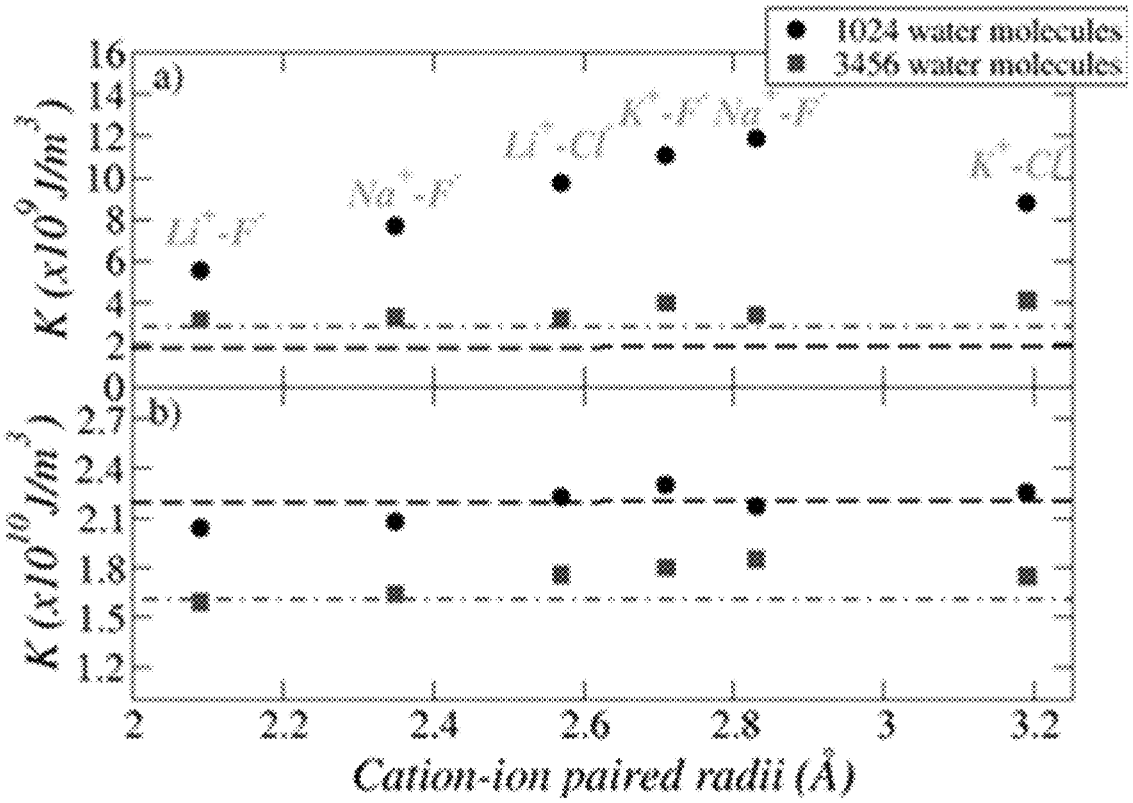
FIG. 11 shows the bulk modulus K computed at T=300 K, panel a) and at T=350 K, panel b). Circles refer to the case with 1024 water molecules, while squares refer to the case with 3456 water molecules. The darker dashed lines indicate the values of K for pristine plastic ice VII with 1024 water molecules, while the lighter dashed-dotted lines indicate the values of K for pristine plastic ice VII with 3456 water molecules.

Unlike previous experimental investigations on dirty ice VII, the disclosed simulations indicate that the presence of impurities does not affect appreciably the density of plastic ice VII (see TABLE 1). On the other hand, the input of salt impurities partially affects K. In FIG. 11 the values of K computed at T=300 K (panel a)) and at T=350 K (panel b)) are reported, conditions at which plastic ice VII shows sluggish and fast rotational dynamics, respectively. Circles refer to dirty plastic ice VII with 1024 water molecules, while squares refer to 3456 water molecules. Values for pristine plastic ice VII are shown as dashed and dashed-dotted lines, respectively.

One significant aspect are the different scales of K: the bulk modulus of pristine plastic ice VII with sluggish rotational dynamics (panel a) is one order of magnitude smaller than the bulk modulus of pristine plastic ice VII with fast molecular rotations. This implies that a dynamic hydrogen bond network increases the ability to withstand isotropic changes in the volume of the sample.

The values of dirty plastic ice VII are reported against the combined ionic radii of each cation-anion pair. From panel a), it may be observed that the presence of electrolytes substantially increases the bulk modulus only in the case of higher concentration (or lower number of water molecules). In this case, an almost linear dependence of K with respect to the size of the cation-anion pair may be recognized. Upon diluting the system (red squares), the effect of salt impurities on the bulk modulus becomes less pronounced.

Figure 12:
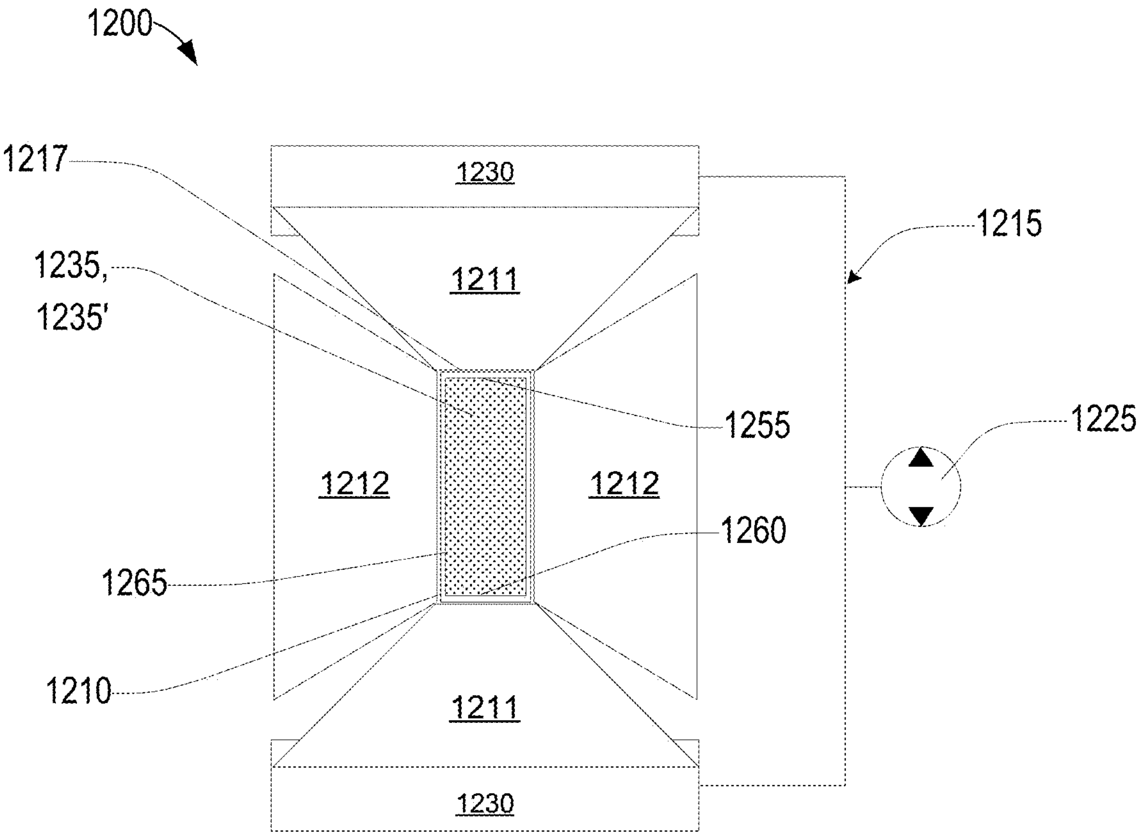
FIG. 12 is a sectional view of a single stage, high pressure belt press (HPP) suitable for transforming water into a block of plastic ice VII, consistent with some embodiments.

Turning now to one embodiment the application of the above-described parameters to selectively remove one or more specific ion(s) from water as part of a tailored treatment processes to application requirements, FIG. 12 is a sectional view of a single stage, high pressure belt press (HPP) 1200 suitable for transforming water into a block of plastic ice VII, consistent with some embodiments. While the single stage belt type HPP 100 is depicted for clarity, multi-stage HPP are also within the scope of this disclosure, as are other HPP arrangements, such as cubic HPP and the split-sphere (BARS) HPP.

The HPP 1200 in FIG. 12 is adapted to apply a predetermined pressure(s) and/or temperature(s) to a water sample 1235 (drawn smaller than scale for clarity) sufficient to transform that water sample 1235 into a block of plastic ice VII, and to further maintain that predetermined pressure(s)/temperature(s) on the water sample 1235 for a predetermined amount(s) of time. The HPP 1200 embodiment in FIG. 12 is a robust and heavy-duty piece of equipment adapted to generate and maintain pressures ranging from about 1.5 to about 6 gigapascals (GPa) or higher, and may comprise several subcomponents that cooperate to create and maintain the required pressures, including a hydraulic system 1205, a pressurization chamber 1210, one or more pressure and/or temperature sensors 1217, and a control system 1220.

The hydraulic system 1215 may be any device adapted to generate and control the pressure in the pressurization chamber 1210. The hydraulic system 1215 may include one or more hydraulic pumps 1225 that pressurizes a fluid 1230, such as oil or water, and transfers the pressure as force to the inside the pressurization chamber 1210. The hydraulic system 1215 is typically designed to ensure that the pressure is evenly distributed across the pressurization chamber 1210 and maintained throughout the plastic ice VII formation process.

The pressurization chamber 1210 may house the water sample 1235, which, in turn, may contain a dissolved material (e.g., one or more ions of different chemical elements) to be removed. The pressurization chamber 1210 may be a generally-cylindrical, sealed compartment that prevents the escape of pressure and maintains a controlled environment during the plastic ice VII formation process. In some embodiments, the pressurization chamber 1210 may comprise a pair of moveable anvils 1211 that are moveable along a first, vertical axis by the hydraulic system 1215 and one or more pre-stressed steel bands 1212 that may constrain the sample in the radial directions, orthogonal to the first axis. In some embodiments, the pressurization chamber 1210 may also be equipped with a cooling system (e.g., fins, water cooling system, intercooler, etc., not shown) that cooperates with the pressure and/or temperatures sensors 1217 to also maintain a predetermined temperature inside the pressurization chamber 1210. Additionally, the anvils 1211 may also include or comprise electrodes (not shown) suitable for applying an electrical potential across the water sample 1235 to speed/enhance the gravity-driven movement of the ions through plastic ice VII.

The water sample 1235 may be transformed (i.e., frozen) into a generally cylindrical block 1235' of crystalized plastic ice VII inside the pressurization chamber 1210. The resulting plastic ice block 1235' may have a planer top surface 1255 (relative to the gravity vector), a bottom surface 1260 (relative to the gravity vector), and a generally cylindrical side surface 1265.

The pressure and/or temperatures sensors 1217 monitor and measure the pressure within the pressurization chamber 1210. These sensors provide feedback to the control system 1215, which in turn, regulates the hydraulic pump to maintain the desired pressure level. The control system 1215 helps to maintain precise and consistent pressure conditions for the growth of high-quality plastic ice VII.

Figure 13:
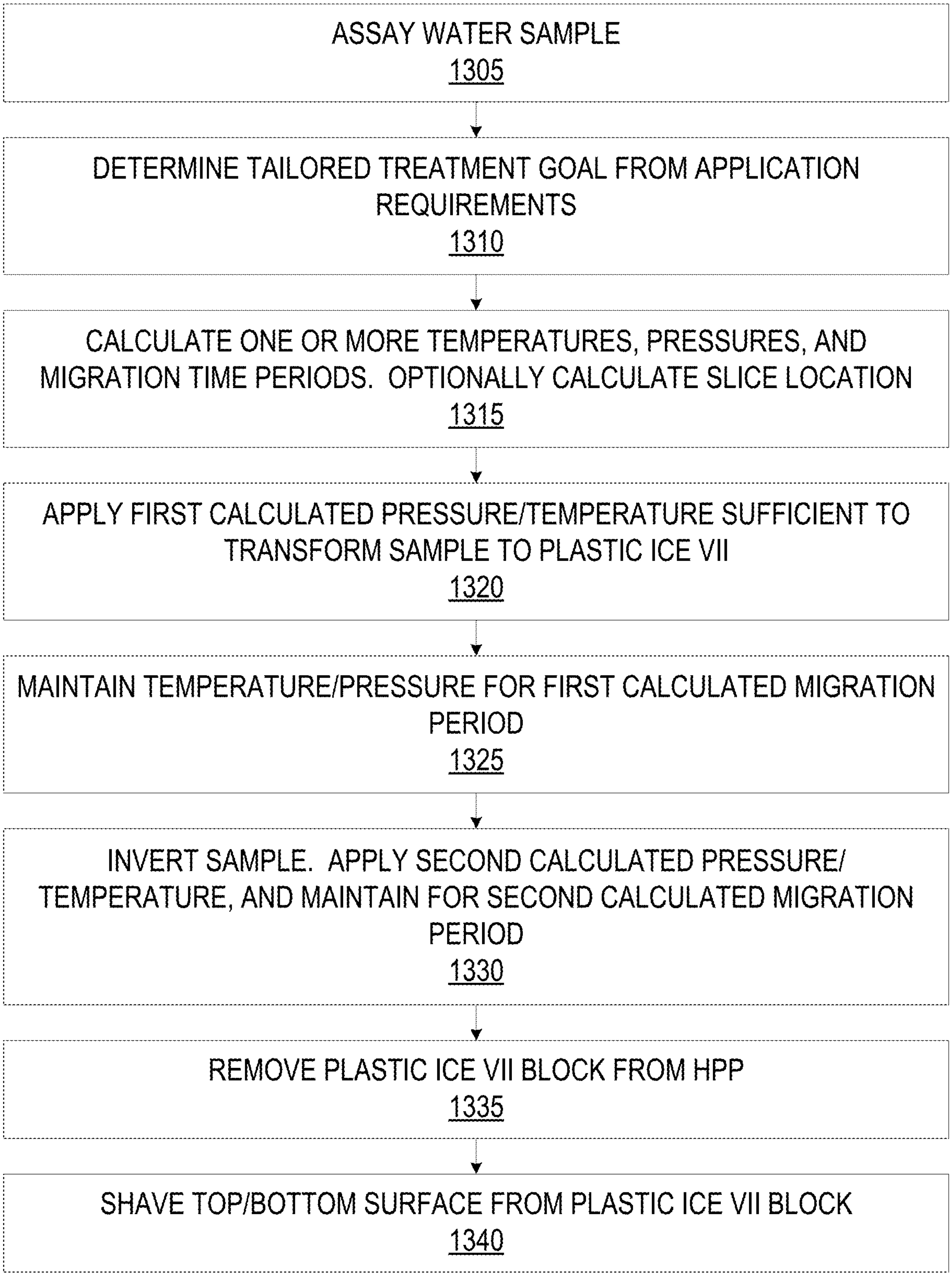
FIG. 13 is a flow chart illustrating one method of selectively removing ions from a water sample solely via changes in pressure and temperature of that water sample, consistent with some embodiments.

FIG. 13 is a flow chart illustrating one method 1300 of selectively removing ions from a water sample solely via changes in pressure and temperature of that water sample, consistent with some embodiments. At operation 1305, an assay of the water sample may be performed to detect which ions are present and to determine their present concentrations. At operation 1310, a tailored treatment goal may be determined from application requirements and the results of that assay. At operation 1315, using the diffusion coefficients of the ions described above, the size of the system (i.e., water sample volume), and the treatment goal, one or more temperatures, pressures, and migration time periods may be calculated. For example, if it is desired to remove substantially all (i.e., 90 percent or greater) of sodium (Na+) ions from 100 milliliters (mL) of water, a suitable migration time period may be between 20 and 30 hours and a slice location may be 5% from a bottom surface. As another example, if it is desired to remove substantially all (i.e., 90% percent or greater) of fluorine (F−) ions from 100 mL may between 40 and 50 hours and the slice location may again be at 5% from the bottom surface. Some embodiments may also calculate a location at which to divide the plastic ice block 1235' ("slice location") at operation 1315.

Next, at operation 1320, the first calculated pressure and temperature may be applied to the water sample e.g., using HPP 1200). This first calculated pressure and temperature may be sufficient to transform the water sample 1235 into a plastic ice VII block 1235'. This first temperature and pressure may be then maintained at operation 1325 for a first calculated migration time period. This first migration time period may be long enough to allow all the ions (i.e., both faster and slower migrating ions) in the block of plastic ice VII 1235' to migrate toward the bottom surface 1260 of the block of plastic ice VII 1235', e.g., by force of gravity. That is, the top portion of the block of plastic ice VII 1235' may now be largely free of all ions.

The block of plastic ice VII 1235' may be physically inverted in the HPP 1200 at operation 1330, repressurized (if necessary), and then held at a calculated pressure/temperature for a second migration time period. That is, the block 1235' is rotated in the HPP such that the top surface 1255 (relative to the gravity vector) is now the bottom surface 1260 (relative to the gravity vector). This operation, in turn, may allow for ions to begin migrating back toward the top surface 1255 (currently located at the bottom of the HPP 1200) by force of gravity. Advantageously, however, different types of ions will migrate at different rates during this second migration period. Accordingly, the second migration time period may be calculated as being long enough for only the faster migrating ions to leave a calculated volume near the top surface 1255. The slower migrating ions, in contrast, will not have time to leave that calculated volume. The slice location, in turn, may be calculated to be between the positions of the faster and slower migrating ions.

Optionally, some embodiments may physically re-invert the block 1235' in the HPP 1200 a second time at operation 1330 (i.e., back to the original orientation), repressurized (if necessary), and then hold the block 1235' at pressure for a third migration time period. This third migration period may allow the fastest ions to re-migrate back, leaving only the next fastest ion type in the bottom of the block 1235. Embodiments using a third migration time period may be desirable if the water sample 1235/block 1235' contains three or more different ions and the tailored treatment goal includes selectively removing neither the fastest nor slowest ions.

After the migration time period(s) have been completed, the crystalized plastic ice VII may be physically removed from the HPP 1200 at operation 1335. The top surface 1255 and/or the lower surface 1260 of the crystalized plastic ice VII 1235' may then be physically removed (i.e., cut with a saw or shaved off with a planer) at the calculated slice location(s) at operation 1340. Alternatively, some embodiments may selectively heat the top 1255 and/or bottom surface 1260, causing the plastic ice VII near that surface to melt and drain away. Depending on the treatment plan, the remaining plastic ice VII in the block 1235' may be allowed to melt into liquid water and/or the cut/shaved portion may be allowed to melt into liquid water. Advantageously, each of the portions (top, bottom, and middle) will contain different concentrations of the selected ion(s). In this way, method 1300 may operate to either remove the selected ions from the water sample and/or to concentrate the selected ions in the water sample.

Figure 14:
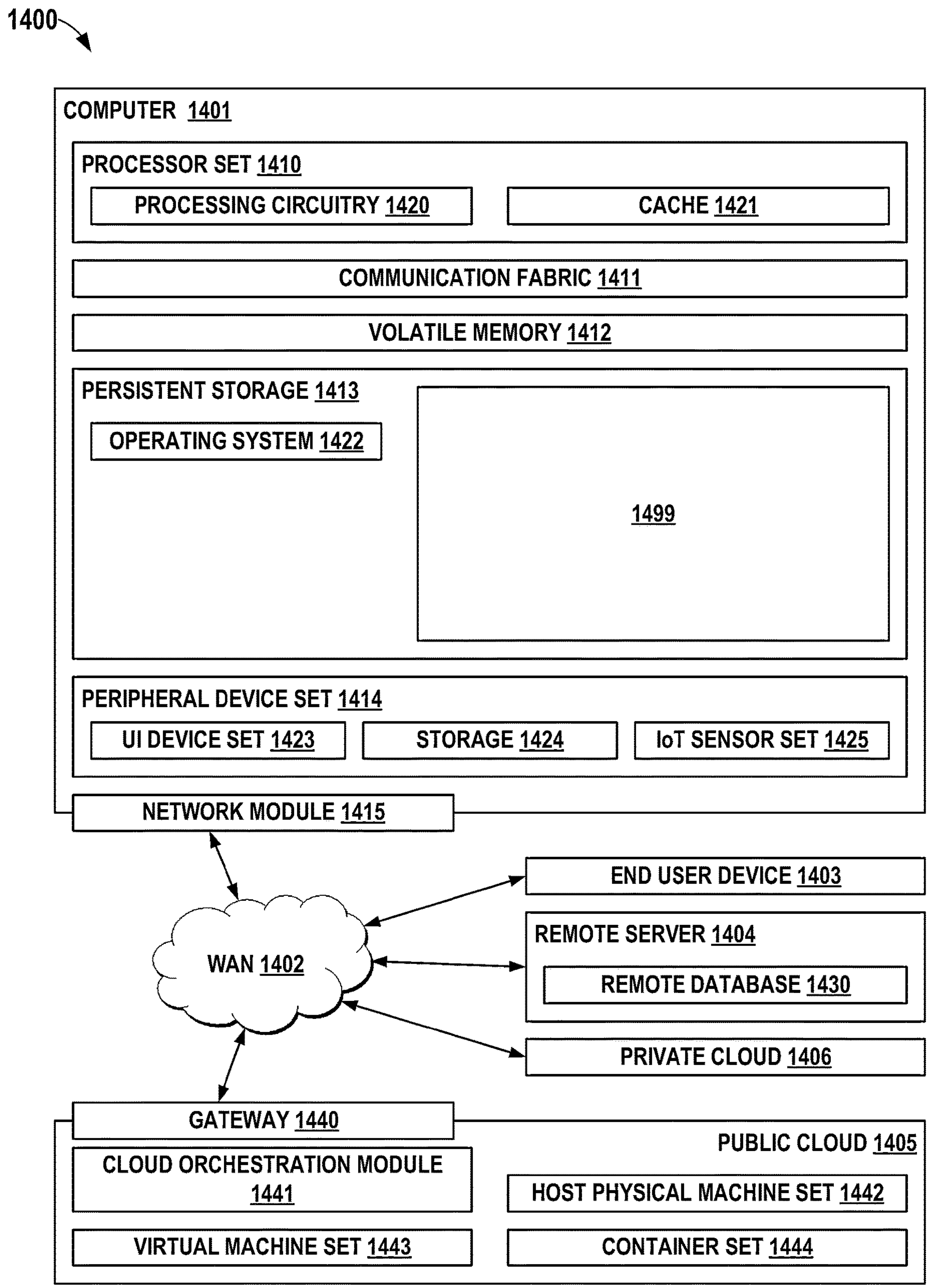
FIG. 14 depicts a system for tuning selectivity of the ion separation methods and systems, including controlling the operation of the HPP to adjust pressure, temperature, and/or lengths of the migration period(s), consistent with some embodiments.

FIG. 14 depicts a control system 1215 for tuning selectivity of the ion separation methods and systems, including controlling the operation of the HPP 1200 to adjust pressure, temperature, and/or lengths of the migration period(s), consistent with some embodiments. Computing environment 1400 contains an example of an environment for the execution of at least some of the computer code involved in performing the inventive methods, such as a pressure, temperature, and migration time profiler 1499 that implements the method 1300 depicted in FIG. 13. In addition to block 1499, computing environment 1400 includes, for example, computer 1401, wide area network (WAN) 1402, end user device (EUD) 1403, remote server 1404, public cloud 1405, and private cloud 1406. In this embodiment, computer 1401 includes processor set 1410 (including processing circuitry 1420 and cache 1421), communication fabric 1411, volatile memory 1412, persistent storage 1413 (including operating system 1422 and block 200, as identified above), peripheral device set 1414 (including user interface (UI) device set 1423, storage 1424, and Internet of Things (IoT) sensor set 1425), and network module 1415. Remote server 1404 includes remote database 1430. Public cloud 1405 includes gateway 1440, cloud orchestration module 1441, host physical machine set 1442, virtual machine set 1443, and container set 1444.

COMPUTER 1401 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1430. As is well understood in the art of computer technology, and depending upon the technology, performance of a computer-implemented method may be distributed among multiple computers and/or between multiple locations. On the other hand, in this presentation of computing environment 1400, detailed discussion is focused on a single computer, specifically computer 1401, to keep the presentation as simple as possible. Computer 1401 may be located in a cloud, even though it is not shown in a cloud in FIG. 1. On the other hand, computer 1401 is not required to be in a cloud except to any extent as may be affirmatively indicated.

PROCESSOR SET 1410 includes one, or more, computer processors of any type now known or to be developed in the future. Processing circuitry 1420 may be distributed over multiple packages, for example, multiple, coordinated integrated circuit chips. Processing circuitry 1420 may implement multiple processor threads and/or multiple processor cores. Cache 1421 is memory that is located in the processor chip package(s) and is typically used for data or code that should be available for rapid access by the threads or cores running on processor set 1410. Cache memories are typically organized into multiple levels depending upon relative proximity to the processing circuitry. Alternatively, some, or all, of the cache for the processor set may be located "off chip." In some computing environments, processor set 1410 may be designed for working with qubits and performing quantum computing.

Computer readable program instructions are typically loaded onto computer 1401 to cause a series of operational steps to be performed by processor set 1410 of computer 1401 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1421 and the other storage media discussed below. The program instructions, and associated data, are accessed by processor set 1410 to control and direct performance of the inventive methods. In computing environment 1400, at least some of the instructions for performing the inventive methods may be stored in block 1499 in persistent storage 1413.

COMMUNICATION FABRIC 1411 is the signal conduction path that allows the various components of computer 1401 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 1412 is any type of volatile memory now known or to be developed in the future. Examples include dynamic type random access memory (RAM) or static type RAM. Typically, volatile memory 1412 is characterized by random access, but this is not required unless affirmatively indicated. In computer 1401, the volatile memory 1412 is located in a single package and is internal to computer 1401, but, alternatively or additionally, the volatile memory may be distributed over multiple packages and/or located externally with respect to computer 1401.

PERSISTENT STORAGE 1413 is any form of non-volatile storage for computers that is now known or to be developed in the future. The non-volatility of this storage means that the stored data is maintained regardless of whether power is being supplied to computer 1401 and/or directly to persistent storage 1413. Persistent storage 1413 may be a read only memory (ROM), but typically at least a portion of the persistent storage allows writing of data, deletion of data and re-writing of data. Some familiar forms of persistent storage include magnetic disks and solid state storage devices. Operating system 1422 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 1414 includes the set of peripheral devices of computer 1401. Data communication connections between the peripheral devices and the other components of computer 1401 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1423 may include components such as a display screen, speaker, microphone, wearable devices (such as goggles and smart watches), keyboard, mouse, printer, touchpad, game controllers, and haptic devices. Storage 1424 is external storage, such as an external hard drive, or insertable storage, such as an SD card. Storage 1424 may be persistent and/or volatile. In some embodiments, storage 1424 may take the form of a quantum computing storage device for storing data in the form of qubits. In embodiments where computer 1401 is required to have a large amount of storage (for example, where computer 1401 locally stores and manages a large database) then this storage may be provided by peripheral storage devices designed for storing very large amounts of data, such as a storage area network (SAN) that is shared by multiple, geographically distributed computers. IoT sensor set 1425 is made up of sensors that can be used in Internet of Things applications. For example, one sensor may be a thermometer and another sensor may be a motion detector.

NETWORK MODULE 1415 is the collection of computer software, hardware, and firmware that allows computer 1401 to communicate with other computers through WAN 1402. Network module 1415 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1415 are performed on the same physical hardware device. In other embodiments (for example, embodiments that utilize software-defined networking (SDN)), the control functions and the forwarding functions of network module 1415 are performed on physically separate devices, such that the control functions manage several different network hardware devices. Computer readable program instructions for performing the inventive methods can typically be downloaded to computer 1401 from an external computer or external storage device through a network adapter card or network interface included in network module 1415.

WAN 1402 is any wide area network (for example, the internet) capable of communicating computer data over non-local distances by any technology for communicating computer data, now known or to be developed in the future. In some embodiments, the WAN 1402 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1403 is any computer system that is used and controlled by an end user (for example, a customer of an enterprise that operates computer 1401), and may take any of the forms discussed above in connection with computer 1401. EUD 1403 typically receives helpful and useful data from the operations of computer 1401. For example, in a hypothetical case where computer 1401 is designed to provide a recommendation to an end user, this recommendation would typically be communicated from network module 1415 of computer 1401 through WAN 1402 to EUD 1403. In this way, EUD 1403 can display, or otherwise present, the recommendation to an end user. In some embodiments, EUD 1403 may be a client device, such as thin client, heavy client, mainframe computer, desktop computer and so on.

REMOTE SERVER 1404 is any computer system that serves at least some data and/or functionality to computer 1401. Remote server 1404 may be controlled and used by the same entity that operates computer 1401. Remote server 1404 represents the machine(s) that collect and store helpful and useful data for use by other computers, such as computer 1401. For example, in a hypothetical case where computer 1401 is designed and programmed to provide a recommendation based on historical data, then this historical data may be provided to computer 1401 from remote database 1430 of remote server 1404.

PUBLIC CLOUD 1405 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1405 is performed by the computer hardware and/or software of cloud orchestration module 1441. The computing resources provided by public cloud 1405 are typically implemented by virtual computing environments that run on various computers making up the computers of host physical machine set 1442, which is the universe of physical computers in and/or available to public cloud 1405.

The virtual computing environments (VCEs) typically take the form of virtual machines from virtual machine set 1443 and/or containers from container set 1444. It is understood that these VCEs may be stored as images and may be transferred among and between the various physical machine hosts, either as images or after instantiation of the VCE. Cloud orchestration module 1441 manages the transfer and storage of images, deploys new instantiations of VCEs and manages active instantiations of VCE deployments. Gateway 1440 is the collection of computer software, hardware, and firmware that allows public cloud 1405 to communicate through WAN 1402.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1406 is similar to public cloud 1405, except that the computing resources are only available for use by a single enterprise. While private cloud 1406 is depicted as being in communication with WAN 1402, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1405 and private cloud 1406 are both part of a larger hybrid cloud.

In addition, various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

A non-limiting list of examples are provided hereinafter to demonstrate some aspects of the present disclosure. Example 1 is a method for separating selected ions in water, comprising transforming a sample of water into a plastic ice VII block; and physically separating a bottom portion of the plastic ice VII block from a top portion of the plastic ice VII block.

Example 2 includes the features of example 1. This example further comprises calculating a first migration time sufficient for substantially all ions in the plastic ice VII block to migrate into the bottom portion of the plastic ice VII block; and maintaining the plastic ice VII block for the calculated first ion migration time.

Example 3 includes the features of any of Examples 1-2. This example further comprises inverting the plastic ice VII block; calculating a second migration time sufficient for substantially all of a first ion type to migrate into the top portion of the plastic ice VII block; and maintaining the plastic ice VII block for the calculated second ion migration time.

Example 4 includes the features of any of Examples 1-3. This example further comprises re-inverting the plastic ice VII block; calculating a third migration time for a second ion type through the plastic ice block; and maintaining the plastic ice VII block for the calculated third ion migration time.

Example 5 includes the features of any of Examples 1-4. In this example, substantially all of the first ion type migrates out of the top portion of the plastic ice VII block during the calculated third ion migration time; and substantially all of the second ion type remains in bottom portion of the plastic ice VII block during the calculated third ion migration time; and Example 6 includes the features of any of Examples 1-5. In this example, the first ion type is sodium; and the second migration time is between about 20 hours and about 30 hours.

Example 7 includes the features of any of Examples 1-6. In this example, the first ion type is fluorine; and the second migration time is between about 40 hours and about 50 hours.

Example 8 includes the features of any of Examples 1-7. In this example, the first ion type comprises a rare-earth element.

Example 9 includes the features of any of Examples 1-8. In this example, the first ion type comprises fluorocarbon etch gasses.

Example 10 includes the features of any of Examples 1-9. In this example, separating the plastic ice VII block into the top portion and the bottom portion comprises. calculating a cut location of the plastic ice VII block; physically cutting the plastic ice VII block at the cut location into the top portion and the bottom portion; and removing the bottom portion.

Example 11 includes the features of any of Examples 1-10. In this example, separating the plastic ice VII block into a top portion and a bottom portion comprises: calculating a cut location of the plastic ice VII block; and shaving the plastic ice VII block at the cut location.

Example 12 includes the features of any of Examples 1-11. In this example, transforming the sample of water into the plastic ice VII block comprises applying between about 2 and 5 Gigapascals of pressure to sample.

Example 13 includes the features of any of Examples 1-12. In this example, transforming the sample of water into the plastic ice VII block comprises maintaining the sample between about 300 and 500 degrees Kelvin.

Example 14 includes the features of any of Examples 1-13. In this example, transforming the sample of water into the plastic ice VII comprises providing a high pressure press comprising a pressurization chamber and one or more anvils; injecting the sample of water into the pressurization chamber of the high pressure press; and biasing one or more anvils against the same of water in the pressurization chamber.

Example 15 includes the features of any of Examples 1-14. This example further comprises separately transforming the top portion and the bottom portion into liquid water.

Example 16 is purified water sample produced by: providing a water sample, wherein the water sample contains a plurality of first ions; transforming the sample of water into a plastic ice VII block; maintaining the plastic ice VII block for a first migration time sufficient for substantially all ions in the water sample to migrate into a first identified portion of the plastic ice VII block; inverting the plastic ice block; maintaining the plastic ice VII block for a second migration time sufficient for substantially all of the first ions in the water sample to migrate into a second identified portion of the plastic ice VII block; and physically removing the identified second portion of the plastic ice VII block.

Example 17 is purified water sample produced by the method of example 16, wherein the method further comprises calculating the first migration time and the second migration time.

Example 18 is a controller for a high pressure press. The controller in this example comprises one or more processors configured to execute instructions that, when executed on the one or more processors, cause the one or more processors to: calculating a first migration time sufficient for substantially all ions in a plastic ice VII block to migrate into a bottom portion of the plastic ice VII block; generate signals that cause a high pressure press to apply sufficient pressure to transform the sample of water into a plastic ice VII block; and generate signals that cause the high pressure press to the plastic ice VII block for the calculated first migration time.

Example 19 is the controller of claim 18, further comprising instructions to calculate a second migration time sufficient for substantially all of a first ion type to migrate into a top portion of the plastic ice VII block; and generate signals that cause the high pressure press to maintain the plastic ice VII block for the calculated second migration time.

Example 20 includes the features of any of Examples 1-19. In this example, the method and system are filter-less and membrane-less.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for separating selected ions in water, comprising:

transforming a sample of water containing the selected ions into a plastic ice VII block; and physically separating a bottom portion of the plastic ice VII block from a top portion of the plastic ice VII block.

2. The method of claim 1, further comprising:

calculating a first migration time sufficient for substantially all ions in the plastic ice VII block to migrate into the bottom portion of the plastic ice VII block; and maintaining the plastic ice VII block for the calculated first ion migration time.

3. The method of claim 2, further comprising:

inverting the plastic ice VII block;

calculating a second migration time sufficient for substantially all of a first ion type to migrate into the top portion of the plastic ice VII block; and maintaining the plastic ice VII block for the calculated second migration time.

4. The method of claim 3, further comprising:

re-inverting the plastic ice VII block;

calculating a third migration time for a second ion type through the plastic ice block; and maintaining the plastic ice VII block for the calculated third ion migration time.

5. The method of claim 4, wherein:

substantially all of the first ion type migrates out of the top portion of the plastic ice VII block during the calculated third ion migration time; and substantially all of the second ion type remains in bottom portion of the plastic ice VII block during the calculated third ion migration time.

6. The method of claim 3, wherein the first ion type is sodium; and wherein the second migration time is between about 20 hours and about 30 hours.

7. The method of claim 3, wherein the first ion type is fluorine; and wherein the second migration time is between about 40 hours and about 50 hours.

8. The method of claim 3, wherein the first ion type comprises a rare-earth element.

9. The method of claim 3, wherein the first ion type comprises fluorocarbon etch gasses.

10. The method of claim 1, wherein separating the plastic ice VII block into the top portion and the bottom portion comprises:
calculating a cut location of the plastic ice VII block;
physically cutting the plastic ice VII block at the cut location into the top portion and the bottom portion; and
removing the bottom portion.

11. The method of claim 1, wherein separating the plastic ice VII block into the top portion and the bottom portion comprises:
calculating a cut location of the plastic ice VII block; and
shaving the plastic ice VII block at the cut location.

12. The method of claim 1, wherein transforming the sample of water into the plastic ice VII block comprises applying between about 2 and 5 Gigapascals of pressure to the sample.

13. The method of claim 1, wherein transforming the sample of water into the plastic ice VII block comprises maintaining the sample between about 300 and 500 degrees Kelvin.

14. The method of claim 1, wherein transforming the sample of water into the plastic ice VII comprises:
providing a high pressure press comprising a pressurization chamber and one or more anvils;
injecting the sample of water into the pressurization chamber of the high pressure press; and
biasing one or more anvils against the same of water in the pressurization chamber.

15. The method of claim 1, further comprising separately transforming the top portion and the bottom portion into liquid water subsequent to physically separating the top portion and the bottom portion.

16. The method of claim 1, wherein the method is a filter-less and membrane-less process.

17. A purified water sample produced by:
providing a water sample, wherein the water sample contains a plurality of first ions;
transforming the sample of water into a plastic ice VII block;
maintaining the plastic ice VII block for a first migration time sufficient for substantially all ions in the water sample to migrate into a first identified portion of the plastic ice VII block; and
inverting the plastic ice block;
maintaining the plastic ice VII block for a second migration time sufficient for substantially all of the first ions in the water sample to migrate into a second identified portion of the plastic ice VII block; and
physically removing the identified second portion of the plastic ice VII block.

18. The purified water sample produced by the method of claim 17, wherein the method further comprises calculating the first migration time and the second migration time.

* * * * *